(12) United States Patent  
Masuda et al.

(10) Patent No.: US 7,069,007 B2
(45) Date of Patent: Jun. 27, 2006

(54) RADIO SWITCHING SYSTEM PROVIDING SERVICE RESTRAINING MOVE OF MOBILE SUBSCRIBER, AND MOBILE SWITCHING CENTER ADAPTED THEREFOR

(75) Inventors: Hiroyo Masuda, Kawasaki (JP); Masaya Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 794 days.

(21) Appl. No.: 09/749,484

(22) Filed: Dec. 26, 2000

(65) Prior Publication Data

US 2001/0005676 A1    Jun. 28, 2001

(30) Foreign Application Priority Data

Dec. 28, 1999    (JP)    ............................ 11-374031

(51) Int. Cl.
*H04Q 7/20*    (2006.01)
(52) U.S. Cl. ............... 455/433; 455/422.1; 455/435.1; 455/439
(58) Field of Classification Search ............ 455/422.1, 455/432.1, 433, 435.1, 436, 437, 438, 439
See application file for complete search history.

(56) References Cited

U.S. PATENT DOCUMENTS

| | | | | |
|---|---|---|---|---|
| 6,018,655 | A * | 1/2000 | Bartle et al. ................. | 455/421 |
| 6,032,044 | A * | 2/2000 | Shannon et al. ............. | 455/433 |
| 6,058,301 | A * | 5/2000 | Daniels ....................... | 455/411 |
| 6,073,010 | A * | 6/2000 | Dufour ....................... | 455/432.3 |
| 6,192,237 | B1 * | 2/2001 | Clapton et al. .............. | 455/421 |
| 6,212,390 | B1 * | 4/2001 | Rune ......................... | 455/456.6 |
| 6,377,806 | B1 * | 4/2002 | Tokuyoshi ................... | 455/437 |
| 6,560,455 | B1 * | 5/2003 | Amin et al. ................. | 455/432.3 |
| 6,560,457 | B1 * | 5/2003 | Silver et al. ................. | 455/445 |
| 6,597,909 | B1 * | 7/2003 | Takubo et al. ............... | 455/433 |

FOREIGN PATENT DOCUMENTS

| | | |
|---|---|---|
| JP | 6-133359 | 5/1994 |
| JP | 6-189360 | 7/1994 |
| JP | 6-197180 | 7/1994 |
| JP | 10327474 | 12/1998 |
| JP | 10336739 | 12/1998 |
| JP | 11-146068 | 5/1999 |
| JP | 11-196453 | 7/1999 |
| JP | 11225375 | 8/1999 |
| JP | 11234736 | 8/1999 |

OTHER PUBLICATIONS

Japanese Office Action dated Dec. 21, 2004 with translation.

* cited by examiner

*Primary Examiner*—Temica Beamer
(74) *Attorney, Agent, or Firm*—Katten Muchin Rosenman LLP

(57) ABSTRACT

A radio switching system includes a mobile subscriber; a base station controller for controlling a transmission and reception of a signal of the mobile subscriber within an own cell; a mobile switching center connecting with a plurality of the base station controllers; and a home location register for storing home zone information whether or not the mobile subscriber is a subscriber of home zone services. The mobile switching center judges whether or not a registration is accepted with respect to a location registration request inside/outside a home zone of the mobile subscriber, based on home zone information sent from the home location register.

9 Claims, 19 Drawing Sheets

Location Registration Acceptance Message (example)

← Newly added

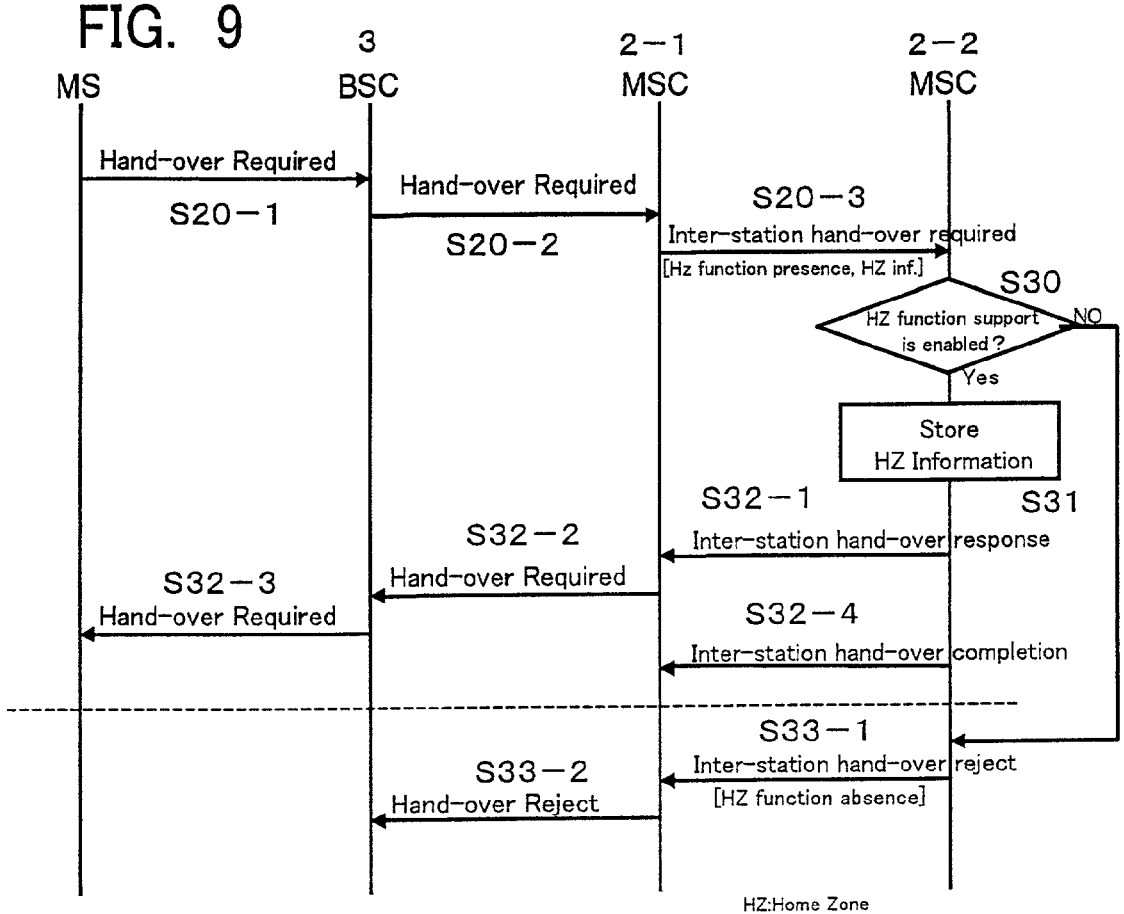
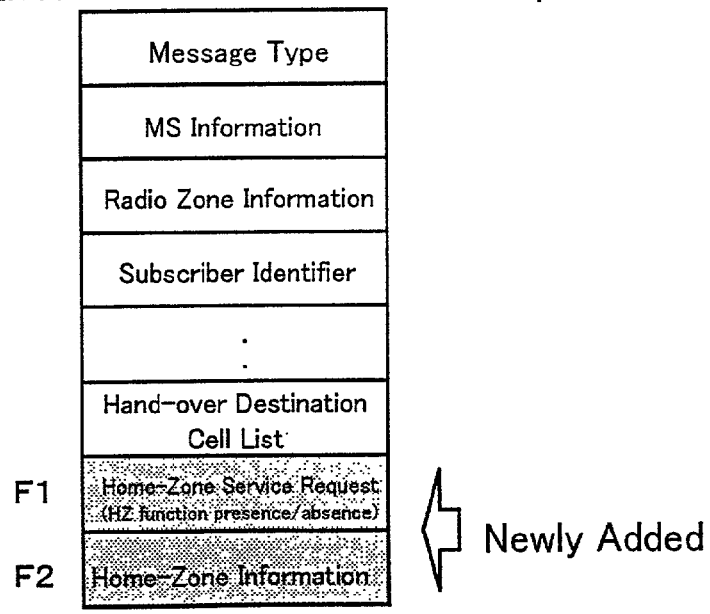

Accounting Ticket Format

Accounting Ticket Format

Accounting Ticket Format

RADIO SWITCHING SYSTEM PROVIDING SERVICE RESTRAINING MOVE OF MOBILE SUBSCRIBER, AND MOBILE SWITCHING CENTER ADAPTED THEREFOR

BACKGROUND OF THE INVENTION

1. Field of the Invention

The present invention relates to a radio switching system for providing services restricting a move of a mobile subscriber, and a mobile switching center adapted therefor.

2. Description of the Related Arts

In recent years, a radio switching system targeting a mobile subscriber, for example, a portable telephone, is overspread, and each radio switching connection service enterprise provides various services.

In such conditions, an accounting system among various services is important as it is largely meritorious for subscribers, in particular. Here, a fixed telephone services restrict a message addressee's region, whereby the accounting system discounting a message tariff is generalized.

However, in the radio switching system targeting the mobile subscriber, based on a notion that the mobile subscriber moves between respective radio zones, while speaks by a telephone, the accounting system restricting such the message addressee's region is not provided.

However, in recent years, the number of mobile subscribers increases, and the use aspects are diversified. The mobile subscriber moves within a specified radio zone, but there are many use aspects such that the mobile subscriber scarcely moves striding over different radio zones.

Accordingly, in the radio switching system on the assumption that the mobile subscriber moves, additional services for restricting mobility of the mobile subscriber in a partial range are provided, and can be reflected on the accounting. Such the system is desired to provide.

SUMMARY OF THE INVENTION

It is therefore an object of the present invention to adopt a notion of a home zone, and provide a radio switching system which provides services restricting a moving area of a mobile subscriber referencing this home zone, and a mobile switching center adapted therefor.

It is another object of the present invention to provide a radio switching system capable of providing restrictive services of a moving area in which a use aspect of the mobile subscriber reflects an accounting system, and a mobile switching center adapted therefor.

It is a specific object of the present invention to realize various accounting aspects by moving information of a mobile subscriber during speaking by a telephone based on such area restrictive services in the radio switching system.

In order to attain the above object, according to a first aspect of the present invention there is provided a radio switching system, comprising a mobile subscriber; a base station controller for controlling a transmission and reception of a signal of the mobile subscriber within its own cell; a mobile switching center connecting with a plurality of the base station controllers; and a home location register for storing home zone information whether or not the mobile subscriber is a subscriber of home zone services, wherein the mobile switching center judges by a position registration request inside/outside a home zone by the mobile subscriber whether or not the registration is accepted, based on the home zone information transmitted from the home location register. Preferably, each time a radio area is changed by a hand-over, etc. of the mobile subscriber, based on the home zone information, the radio switching system further performs a processing in response to registration conditions inside/outside the home zone of the mobile subscriber. Preferably the registration conditions inside/outside the mobile subscriber are a service condition and the number of times of allowable hand-over. Preferably, it further comprises a plurality of the mobile switching centers, and when the change of the radio area by the hand-over, etc. of the mobile subscriber strides over the plurality of mobile switching centers, the home zone information is added to existent hand-over messages, and is transmitted and received between the plurality of mobile switching centers. Preferably, the mobile switching center collects a history in the hand-over during speaking by a telephone as accounting information. Preferably, the history in the hand-over is the number of times of hand-over, positions before and after the hand-over. Preferably, the mobile switching center restricts additional services in addition to call origination and termination services of the mobile subscriber. It further comprises means for notifying the mobile subscriber of the point of time when an access by the mobile subscriber is caused and a fact that the subscriber is inside or outside the home zone during speaking by the telephone. Preferably, the means for notifying the mobile subscriber sends audible information or text information.

In order to achieve the above object, according to a second aspect of the present invention there is provided a radio switching system, comprising a mobile subscriber; a base station controller for controlling a transmission and reception of a signal of the mobile subscriber within its own cell; a mobile switching center connecting with a plurality of the base station controllers; and a home location register for storing home zone information whether or not the mobile subscriber is a subscriber of home zone services, wherein a location registration area where, after the mobile subscriber subscribed in the home zone services makes a service subscription request in the mobile switching center, a location registration is first performed, or a location registration area until, in the case where the mobile subscriber desires to register a plurality of areas, the number of areas which are registered the locations reaches a predetermined number is established as a home zone.

In order to attain the above object, according to a third aspect of the present invention there is provided a radio switching system, comprising a mobile subscriber; a base station controller for controlling a transmission and reception of a signal of the mobile subscriber within its own cell; a mobile switching center connecting with a plurality of the base station controllers; and a home location register for storing home zone information whether or not the mobile subscriber is a subscriber of home zone services, wherein the mobile switching center has means for counting the number of times of location registration of each area in which the mobile subscriber subscribed in the home zone services performed the location registration within a predetermined period of time, and the location registration area where the number of times of registration counted by the counting means after the predetermined period of time is expired is high is established as a home zone.

In order to achieve the above object, according to a fourth aspect of the present invention there is provided a mobile switching center of a radio switching system for processing a hand-over request in a received mobile subscriber, wherein accounting information in response to the hand-over request in the received mobile subscriber, or a message rate of completion of the hand-over process is formed. Preferably, the accounting information contains recognition information as any one of the interior and exterior of the home zone based on both the position information of the mobile subscriber when receiving the hand-over request, and home zone information sent from a home location register which stores the home zone information containing information whether or not the mobile subscriber is a subscriber of the home zone services.

The above and other features of the present invention will become more apparent from the following description of the preferred embodiments when read in conjunction with the accompanying drawings.

BRIEF DESCRIPTION OF THE DRAWINGS

FIG. 9 is a processing flow according to a third embodiment of the present invention.

FIG. 10 is a view showing an example of a message format;

DESCRIPTION OF THE PREFERRED EMBODIMENTS

Presently preferred embodiments of the present invention will now be described with reference to the drawings.

Figure 1:
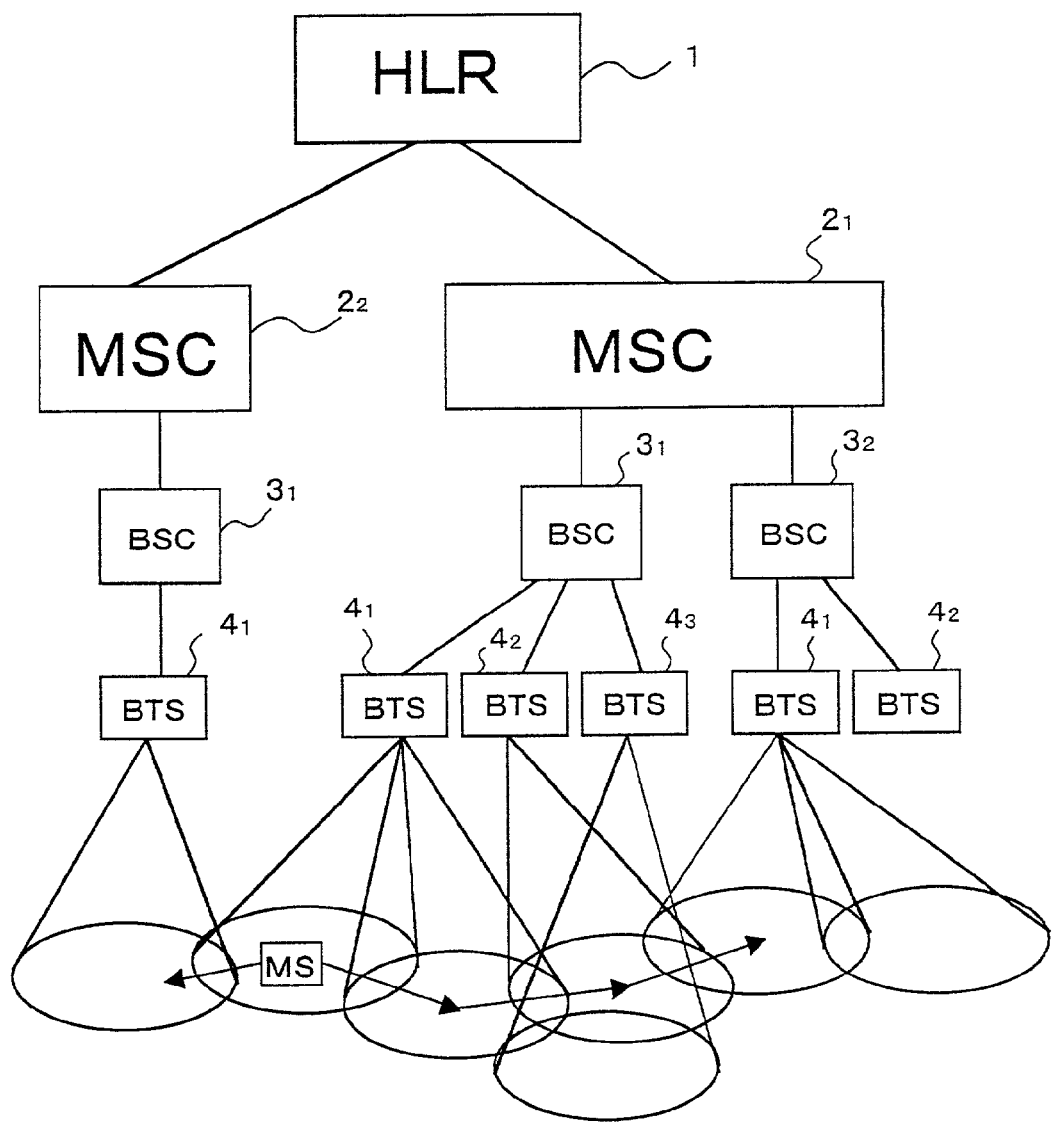
FIG. 1 is a view for explaining an outline of a radio switching system to which the present invention is applied.

FIG. 1 is a view for explaining an outline of a radio switching system to which the present invention is applied. This system has a home location register (HLR) 1 in the upper level, which registers subscriber information of each mobile subscriber (MS). A plurality of mobile switching centers (MSC) $2_1$ to $2_2$ are connected under control of the home location register 1.

The mobile switching centers (MSC) $2_1$ to $2_2$ are connected to a plurality of base station controllers (BSC) $3_1$ to $3_3$, respectively. Furthermore, a plurality of base stations $4_1$ to $4_3$ belong to the plurality of base station controllers (BSC) $3_1$ to $3_3$, respectively, and transmit and receive signals to and from the mobile subscriber MS in a corresponding radio cell.

In the radio switching system of FIG. 1, the location registration control according to the embodiment of the present invention will be explained below.

Figure 2:
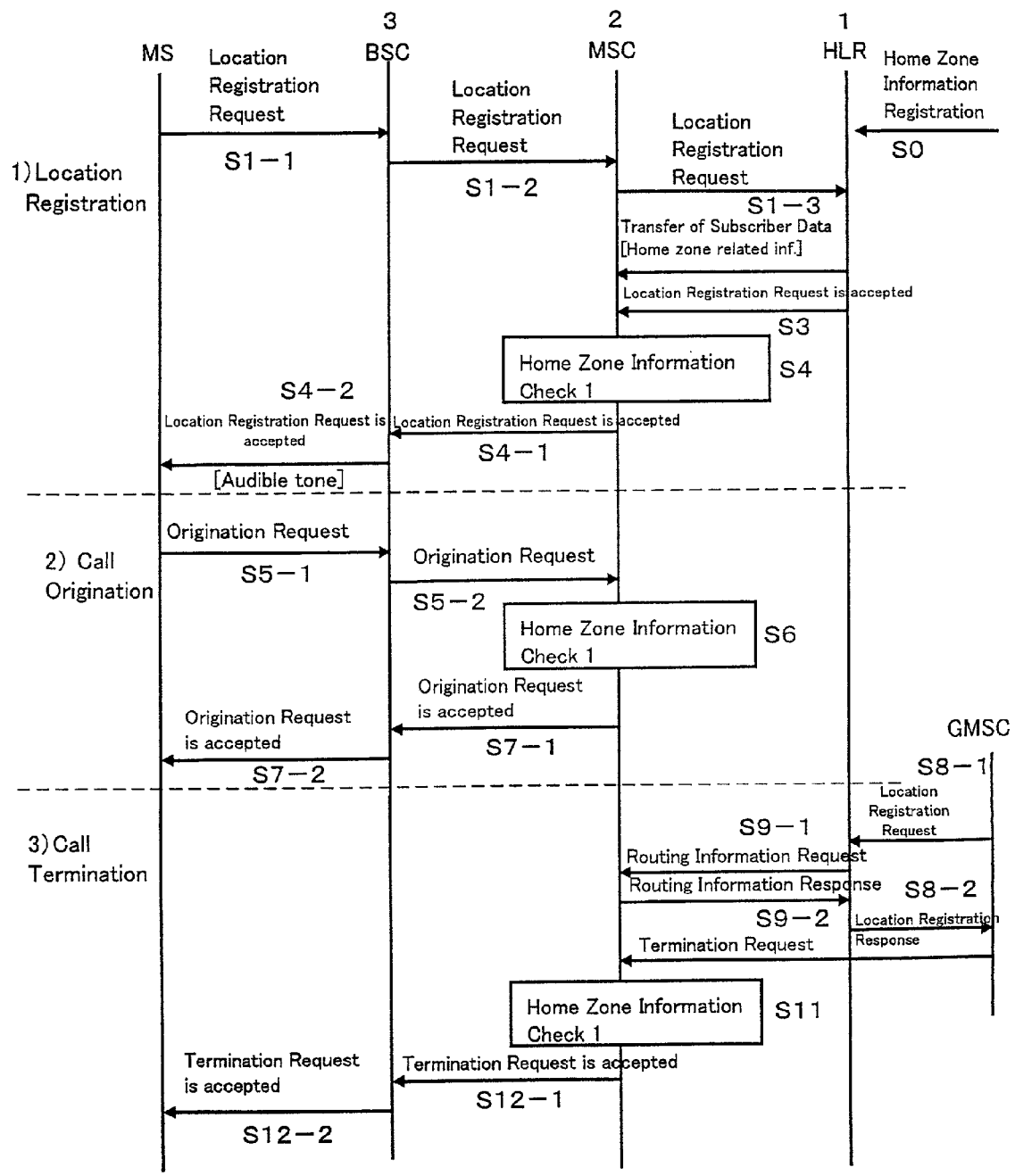
FIG. 2 is a basic sequence flow of a call processing of controlling a location registration according to the present invention.

FIG. 2 is a basic sequence flow of a call processing of the location registration control according to the present invention. In FIG. 2, the base station controller (BSC) and base station (BTS) explained in FIG. 1 are shown as merely a base station controller (BSC) as one body. This is also same in a sequence flow according to the other embodiments for use in the following explanation.

At the time of the location registration of the mobile subscriber, an interface, in which a home zone (a cell and location registering area or another newly defined zone unit) of the mobile subscriber is possible to be registered as subscriber's data, is prepared.

As this interface, a flag and a memory area are prepared in a home location register (HLR). The flag indicates that the mobile subscriber subscribes to home zone services, and the memory area stores a type of services (for example, call origination) available in a home zone data area and in other than a home zone, and hand-over (an inter-zone move) conditions (for example, the number of times of the hand-over to outside the home zone).

These hand-over conditions may be in zone unit, or same as the entire of a plurality of zones.

At the time of making a location registration, a location registration request (LUD) is caused from the mobile subscriber (MS) to a mobile switching center (MSC) 2 through a corresponding base station controller (BSC) 3, and further the case where the mobile switching center (MSC) 2 is accessed to the home location register (HLR) 1 (steps S1-1 to 1-3) will be considered.

Data such as flag information, etc. whether or not the mobile subscriber is the home zone service subscriber are sent from the home location register (HLR) 1 to the mobile switching center (MSC) 2 together with subscriber data. Concurrently, a gist of reception of the location registration request is accepted (step S3).

The mobile switching center (MSC) 2 holds the data received, and based on the data, functions of accepting or prohibiting the location registration, call origination and call termination, and functions of the mobile subscriber (MS) are provided as follows:

That is, at the time of the occurrence of the location registration request, it is judged whether the subscriber is inside or outside the home zone from the location information received from the base station controller (BSC) 3, and it is judged whether or not the location registration is accepted (step S4).

As the judgment results, an audible signal is notified to the mobile subscriber (MS) by way of the base station controller (BSC) 3 (step S4-1) (step S4-2).

Here, an example of checking (step S4) the home zone information in the mobile switching center (MSC) 2 will be explained.

Figure 3:
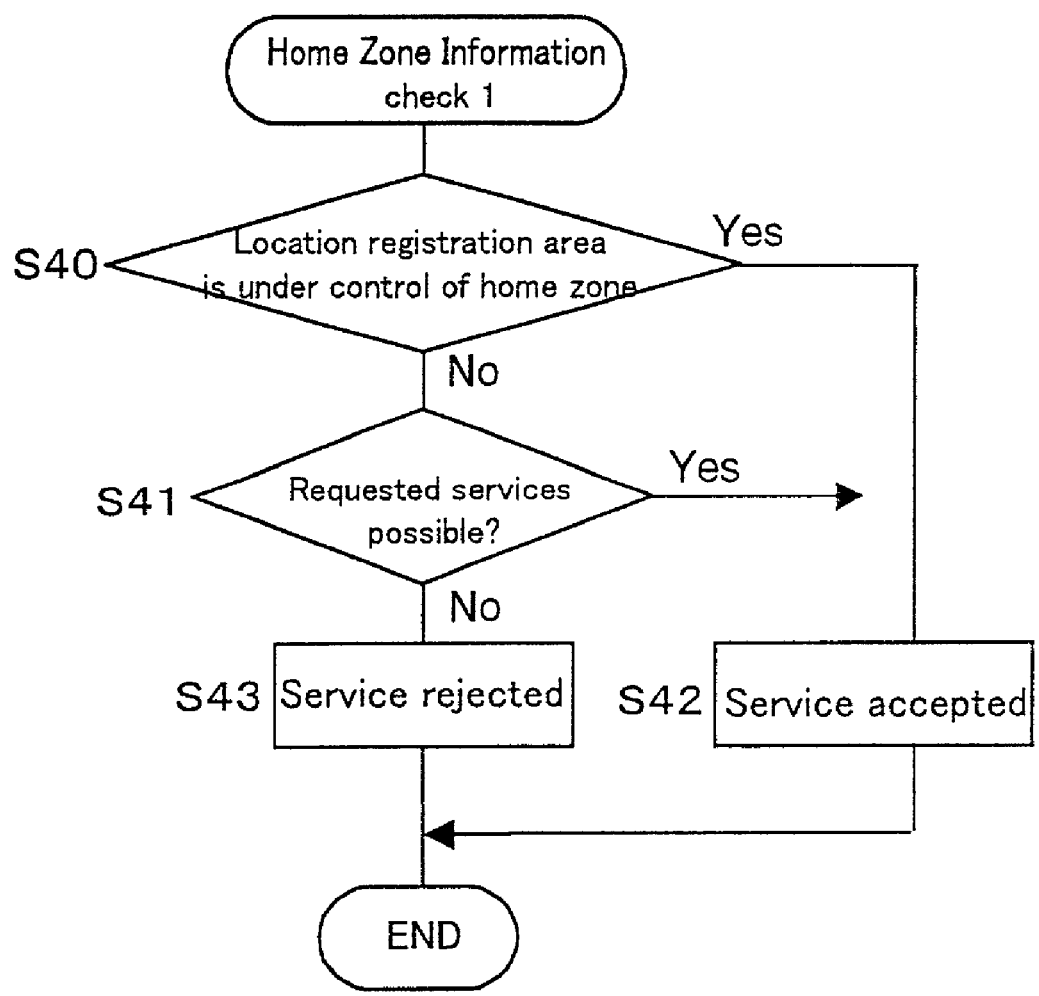
FIG. 3 is an embodiment of step S4 in FIG. 2.

FIG. 3 is an example of step S4, and it is judged whether or not the received location registration area is under control of the home zone of the mobile switching center (MSC) 2 (step S40).

In the case where the received location registration area is under control of the home zone, the services are allowable (step S42). In the case where it is not under control of the home zone, it is judged whether or not message services are possible to be provided in a zone other than the home zone for the corresponding mobile subscriber (MS) (step S41).

It is judged from subscriber information registered to the home location register (HLR) 1 whether or not these message services are possible to be provided.

Returning to FIG. 2, the process in the case where a call origination and call termination are further caused, will be explained.

In the case where a origination request is caused from the mobile subscriber (MS) (step S5-1), the base station controller (BSC) 3 notices this request to the mobile switching center (MSC) 2 (step S5-2).

On the contrary, the mobile switching center (MSC) 2 checks home zone information of the corresponding mobile subscriber (MS) (step S6). The content of the check at this time is same as the check (step S4) of the home zone information in the process of the location registration.

As the results of the check (step S6) of the home zone information, if the origination request is acceptable, the gist is noticed to the originating mobile subscriber (MS) (steps S7-1, S7-2).

Furthermore, in FIG. 2, in the case where the mobile subscriber (MS) receives from the mobile subscriber (MS) in the other home zones, a location registration request is sent from a gateway exchange (Gateway MSC) to the home location register (HLR) 1 (step S8-1).

The home location register (HLR) 1 requests routing information to the specified mobile switching center 2 (step S9-1), and on the contrary, responses the routing information from the mobile switching center 2 (step S9-2).

Thus, the gateway exchange (Gateway MSC) comes to transmit (step S10) a reception request to the mobile switching center 2.

The mobile switching center 2 checks the home zone information in accordance with the flow of FIG. 3 as the same processing as step S4 with respect to the termination request (step S11), and it is judged whether or not the destination mobile subscriber (MS) accepts a termination.

As the results of this judgment, if the service subscriber, the termination request is sent to the mobile subscriber (MS) by way of the base station controller (BSC), thereby enabling a termination request message (steps S12-1, S12-2). If not the service subscriber, disconnected.

In the present invention, as shown in FIG. 2, in addition to the check of the home zone information at the point of time when a call is generated, even after transferring to conversation by a telephone, each time subscriber location information is changed by the hand-over (interzonal moving), etc., it is possible to check whether or not the location of the mobile subscriber (MS) is inside/outside the home zone.

Figure 4:
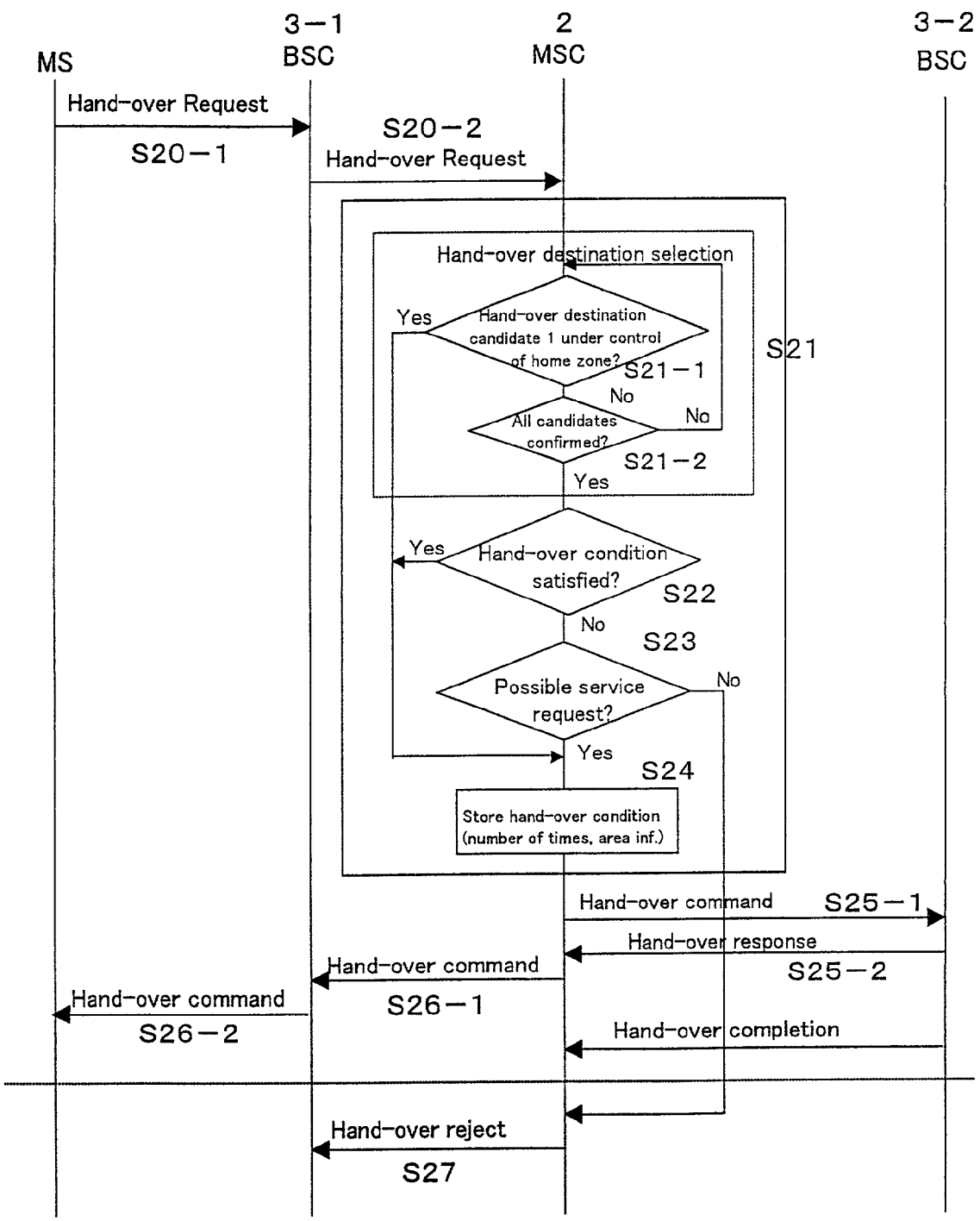
FIG. 4 is a flow showing a processing example of a mobile switching center (MSC) in the case where subscriber location information changes by a hand-over.

FIG. 4 is a flow showing an example of a processing of the mobile switching center (MSC) 2 in the case where the subscriber location information is changed by the hand-over.

When the mobile subscriber (MS) moves striding over the zone, a hand-over request is transmitted to the mobile switching center (MSC) 2 through the base station controller (BSN) 3-1 controlling a current location (steps S20-1, S20-2).

When the mobile switching center (MSC) 2 receives the hand-over request, it selects a hand-over destination (step S21). In this selection of the hand-over destination, it is first judged whether or not the base station controller (BSC) 3-2 as a hand-over destination candidate is under control of the home zone (step S21-1).

In the case where the judged hand-over destination candidate is not under control of the home zone, all candidates are in sequence confirmed until a candidate under control of the home zone appears (step S21-2). In the case where a confirmation of all the candidates is ended, it is judged whether or not the candidate meets hand-over conditions (step S22).

Here, describing the case where the hand-over conditions are met, for example, conversation by a telephone is continued even outside a restrictive region as an option services. Alternatively, within the number of times of a restriction of hand-over, etc.

In the case of not coming under these option services, it is judged whether or not a service request is possible to be provided (step S23). Here, the possible service request is, for example, to confirm a call origination, a call termination, or the like. This is necessary for judging finally whether or not the call termination is allowed even in other than the home zone.

From above, at steps S21-1, in the case where the hand-over destination candidate is under control of the home zone, at step S22, in the case where the hand-over conditions are satisfied, or in the case where it is judged that the service request can be provided, items of the hand-over conditions are stored (step S24). Namely, the number of times of hand-over, hand-over area information, or the like is renewed and stored.

The items of the hand-over conditions which are renewed and stored are collected later, and are transmitted to an accounting center (not shown) as accounting information, so as to utilize an accounting calculation.

Next, the hand-over request is sent to a base station controller (BSC) 3-2 as a hand-over destination (step S25-1). By a hand-over response with respect thereto (step S25-2), a hand-over indication is sent to the mobile subscriber (MS) which issued the hand-over request by way of the base station controller (BSC) 3-1 as a hand-over transmitter (step S26-1) (step S26-2).

In FIG. 4, in the case where it is judged that the service request can not be provided at step S23, the hand-over is rejected (step S27).

Figure 5:
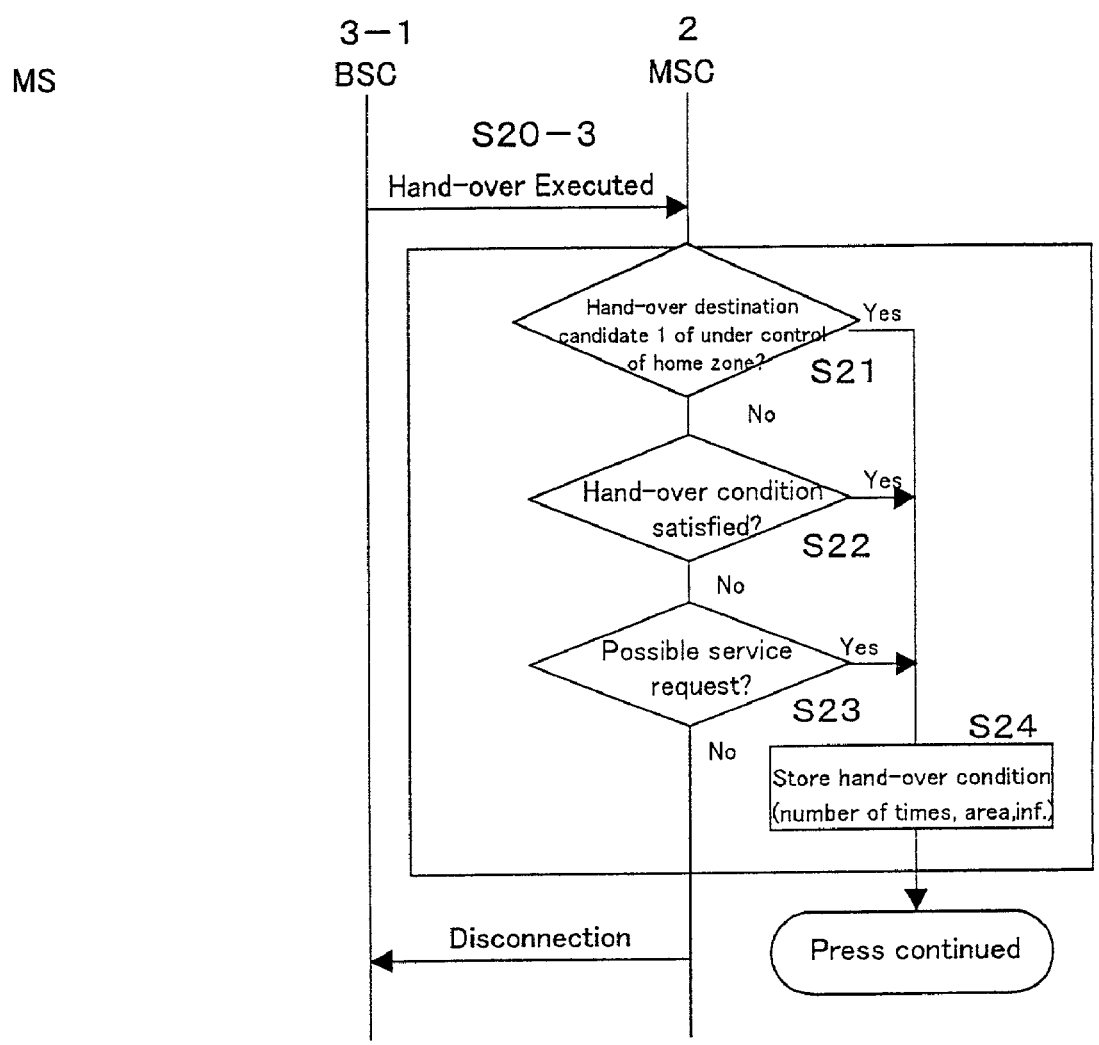
FIG. 5 is a flow showing a processing example of the mobile switching center (MSC) in a process on receipt of hand-over, which is performed for a mobile subscriber.

Even in the process in which the mobile subscriber (MS) to which the hand-over command is sent hands over, the gist is notified to the mobile switching center (MSC) 2 as shown in FIG. 5 (step S20-3), the same processes as processes of steps S21 to S24 shown in FIG. 4 (steps s21 to S24) are executed as shown in FIG. 5.

Figure 6:
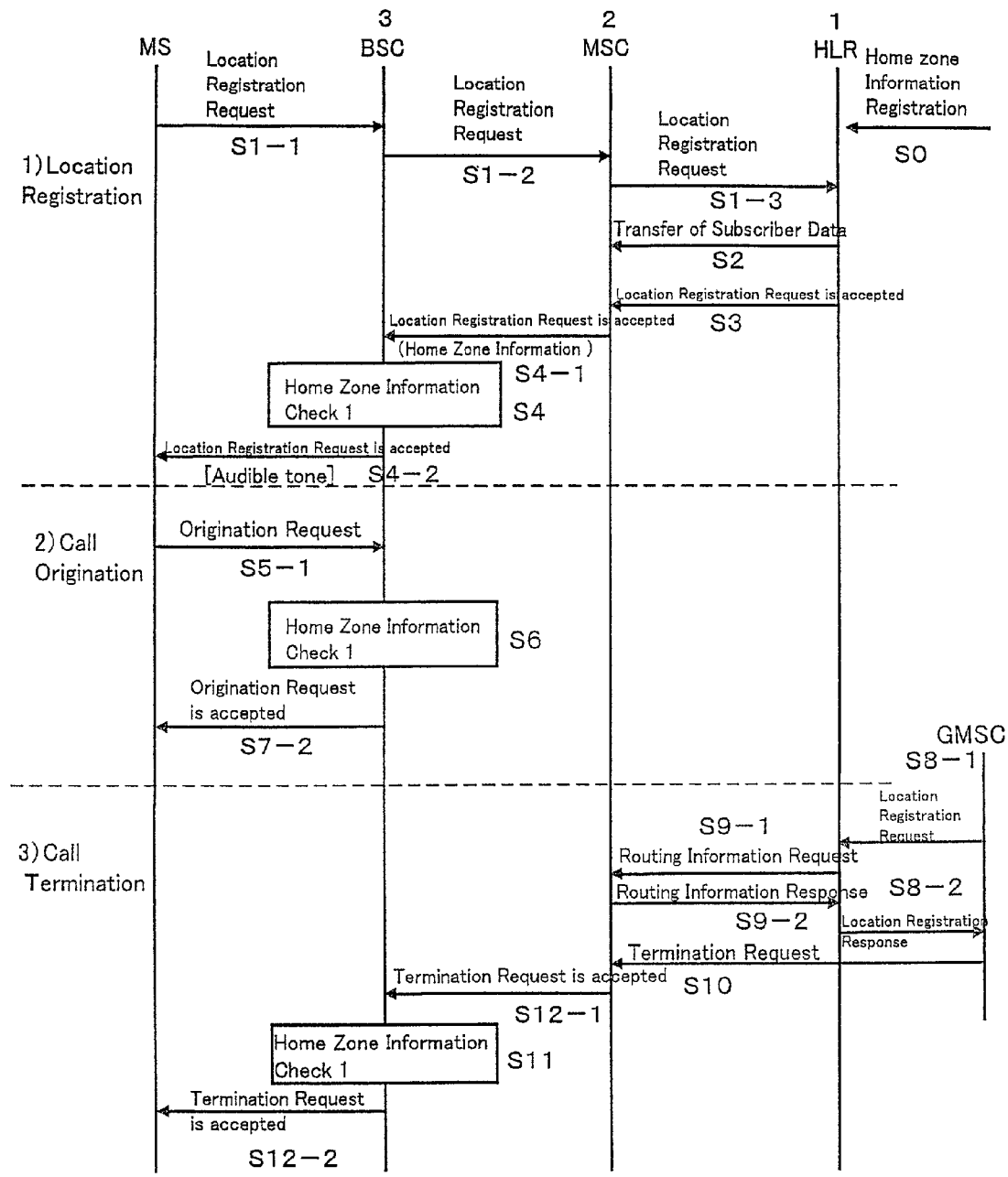
FIG. 6 is a flowchart for explaining operation according to a second embodiment of the present invention.

FIG. 6 is a flowchart for explaining operation according to a second embodiment of the present invention. For the operation of the embodiment of FIG. 2, the check functions of home zone information are executed not as the mobile switching center (MSC) 2 but as the base station controller (BSC) 3.

In the location registration process, the home zone information sent by a transfer (step S2) of the subscriber data from the home location register (HLR) 1 is sent to the base station controller (BSC) 3 as it stands. Accordingly, the home zone information is checked in the base station controller (BSC) 3 (step S4).

Similarly, as compared with FIG. 2, in the case of the occurrence of a call (transmission), a origination request is received by the base station controller 3, and concurrently the home zone information is checked by the base station controller 3 (step S6). If under control of the home zone, the transmission request is not sent to the mobile switching center 2, and is not notified to the mobile switching center (MSC) 2, but a reception of the origination request is directly notified from the base station controller 3 to the mobile subscriber (MS) (step S7-2).

Furthermore, in a process, with respect to the reception request from the gateway exchange (GMSC), this is sent to the base station controller (BSC) 3 as it stands. Accordingly, the home zone information is checked by the base station controller (BSC) 3 (step S11).

In this manner, according to the embodiment in accordance with the flow of FIG. 6, as the home zone information is checked by the base station controller (BSC) 3, a process load of the upper mobile switching center (MSC) 2 is decreased.

Furthermore, according to the embodiment in accordance with the flow of FIG. 2, it is structured that the upper mobile switching center (MSC) 2 allows a location registration request of the mobile subscriber (MS) irrespective of conditions of the base station controller (BSC) 3. Thus, in the case of FIG. 6, the base station controller (BSC) 3 itself can judge whether or not the location registration request is allowable.

Here, in FIG. 6, the home zone information is sent to the base station controller (BSC) 3 by way of the mobile switching center (MSC) 2, and is included in a message of location registration acceptance. This information is shown as FIG. 7.

Figure 7:
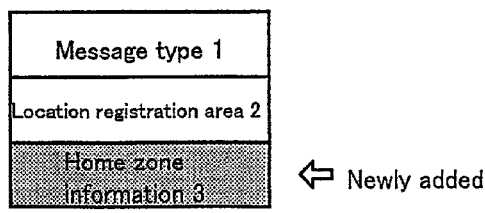
FIG. 7 is an example of a message format of a location registration reception.

FIG. 7 is an example of a message format of the location registration acceptance. The location registration acceptance message has a message type 1 and a location registration area 2, and the home zone information 3 is annexed newly to the location registration acceptance message, whereby in the mobile switching center (MSC) 2 or the base station controller (BSC) 3, the home zone information can be checked (steps S4, S6, S11).

Figure 8:
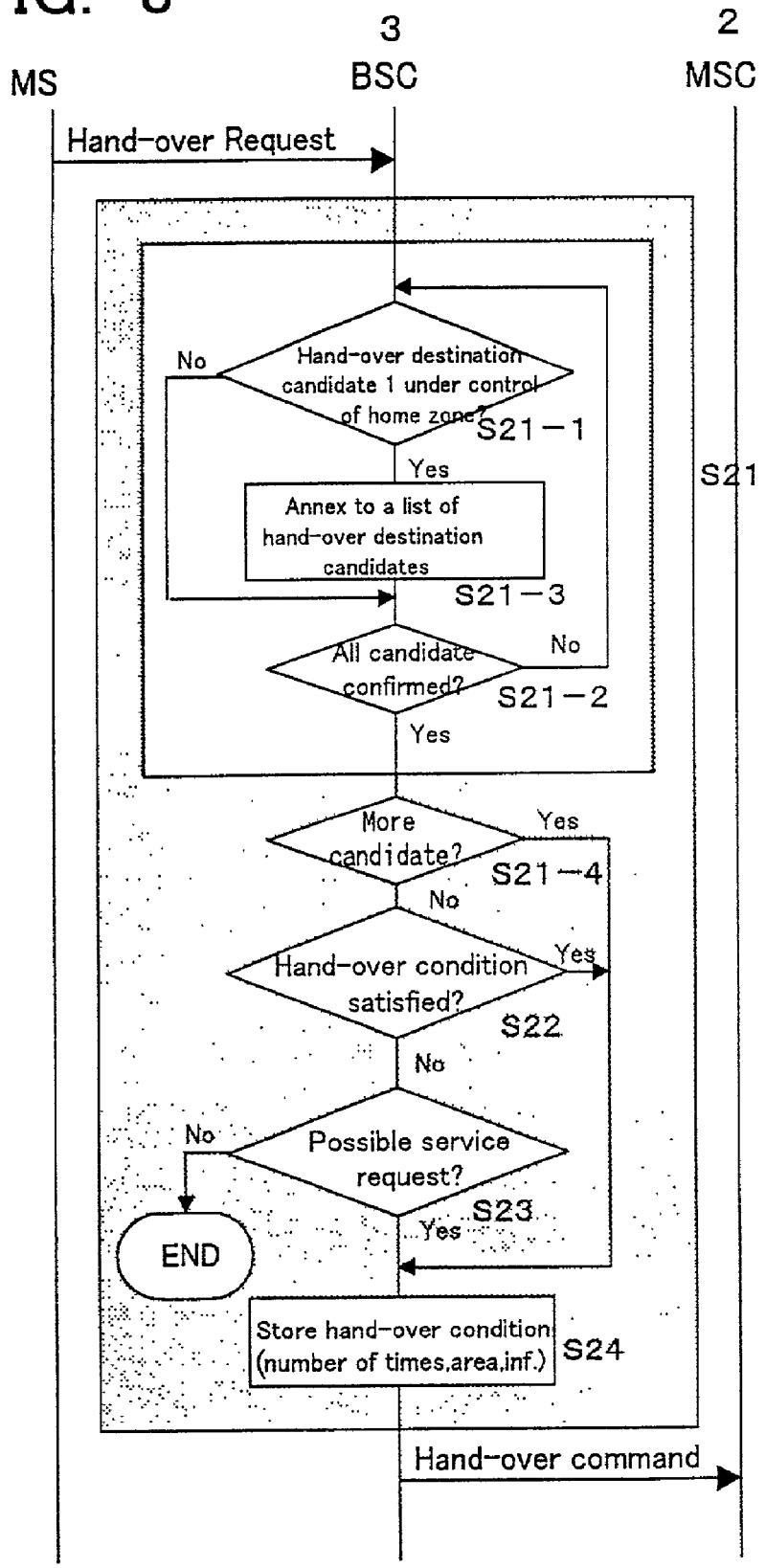
FIG. 8 is a processing flow in a base station controller (BSC) 3 in the case where the hand-over is requested during speaking by a telephone, corresponding to the embodiment of FIG. 6.

FIG. 8 is a processing flow in the base station controller (BSC) 3 in the case where the hand-over is requested during conversation in response to the embodiment of FIG. 6. Namely, in the case where the base station controller (BSC) 3 itself can hand over, the processing content is same as a processing (refer to FIG. 4) of the mobile switching center (MSC) 2 in the case where the hand-over is requested according to the preceding embodiment of FIG. 2.

A different point is below. When it is judged whether or not the hand-over destination is under control of the home zone in the flow of FIG. 8, if it is under control of the home zone, this is annexed to a list of hand-over destination candidates (step S21-3).

FIG. 9 is a processing flow according to a third embodiment of the present invention. In this embodiment, even in the case where the hand-over strides over two different mobile switching centers (MSC) 2-1, 2—2, it is possible to realize by annexing newly the home zone information to an existent hand-over related message which is transmitted and received between the mobile switching centers.

FIG. 10 is an example of an inter-station hand-over request message applicable to the embodiment of FIG. 9. As a home zone service request, a flag F1 indicating presence or absence of home zone functions and home zone information F2 are annexed.

In FIG. 9, such the inter-station hand-over request message is sent from a side of the mobile switching center (MSC) 2-1 requesting a hand-over to the mobile switching center (MSC) 2—2 as a request destination, when a hand-over request is generated from the mobile subscriber (MS) (step S20-3).

According to the case where the mobile switching center (MSC) 2—2 which received this inter-station hand-over request supports home zone functions, and the case where does not support the home zone functions, a processing is sorted (step S30)

That is, in the case where the mobile switching center (MSC) 2—2 does not support the home zone functions, a response which rejects the inter-station hand-over is sent to the mobile switching center (MSC) 2-1 which sent the inter-station hand-over request. Accordingly, the hand-over rejection is notified from the mobile switching center (MSC) 2-1 to the base station controller (BSC) 3 (step S33-2).

In the case where the mobile switching center (MSC) 2—2 supports the home zone functions, a response of the inter-station hand-over is sent to the mobile switching center (MSC) 2-1 which sent the inter-station hand-over request. Accordingly, the mobile switching center (MSC) 2-1 indicates a hand-over to the mobile subscriber (MS) via the base station controller (BSC) 3 (steps S32-2, S32-3).

The gist is notified from the mobile switching center (MSC) 2—2 to the mobile switching center (MSC) 2-1 which generated the inter-station hand-over request, and the inter-station hand-over is ended (step S32-4).

Figure 11:
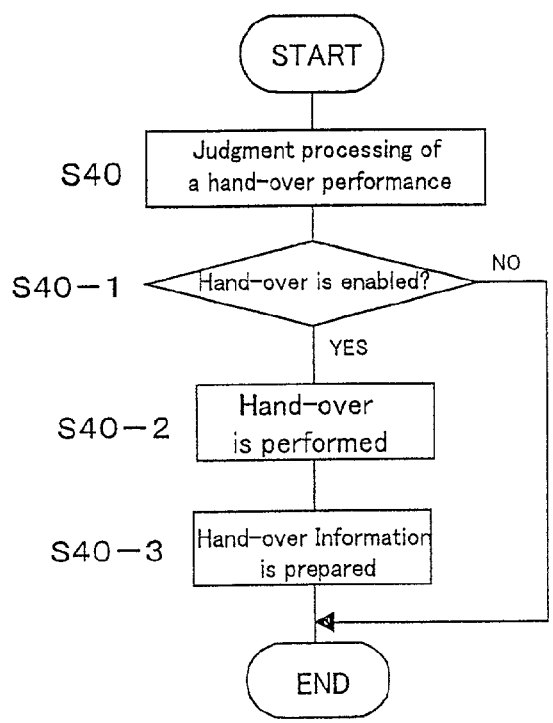
FIG. 11 is an example of an inter-station hand-over request message which is applied to the embodiment of FIG. 9.

FIG. 11 is a processing flow for preparing accounting information based on hand-over execution. In the judgment processing of a hand-over execution requisite explained previously as the embodiment (a check of the home zone information, for example, in FIG. 2, processings of steps S4, S6, S11: step S40), in the case where a hand-over is enabled, this is executed (steps S40-1, S40-2).

After the hand-over is executed, the hand-over information in response to the content is prepared in the mobile switching center (MSC). The hand-over information prepared therein records moving conditions of the speaking subscriber even in the case where any service types or service conditions excluding the home zone are not defined.

At that time, it is possible to prepare subscription conditions indicating whether a record of conditions is executed, or to prepare a system flag #, etc. indicating whether or not this function is applied in system unit.

Figure 12:
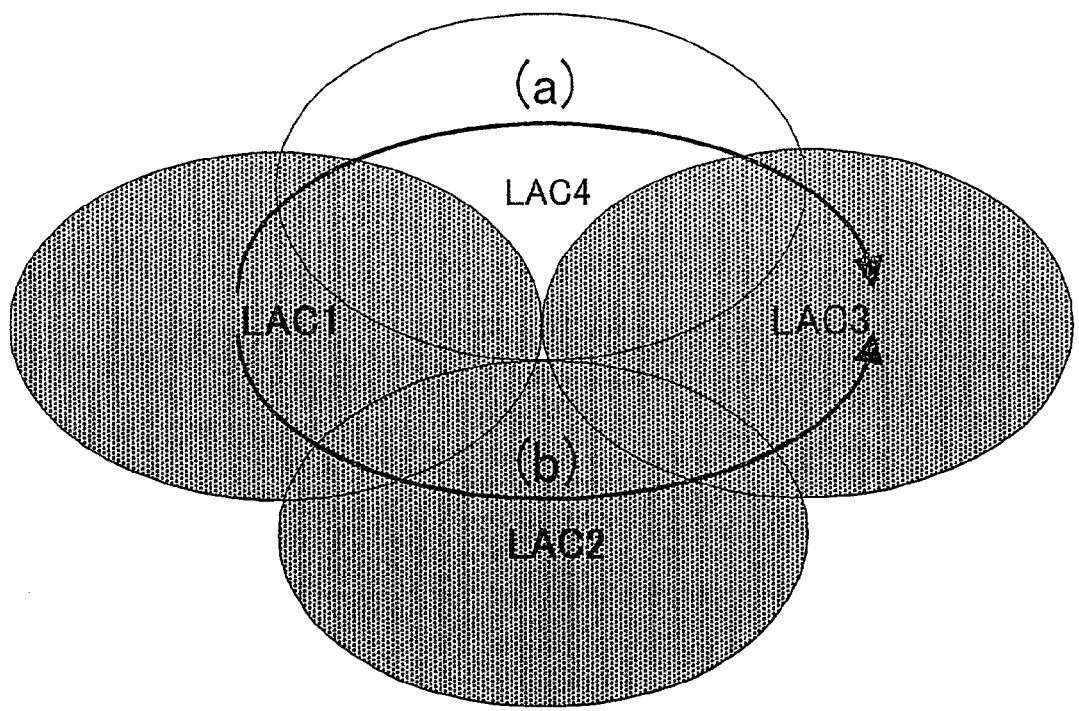
FIG. 12 is a view for explaining a pass of a local area when the subscriber (MS) hands over.

For example, as shown in FIG. 12, when the mobile subscriber (MS) hands over in the home zone, the mobile subscriber (MS) can pass local areas LAC1, LAC2, LAC3 belonging to the home zone, or can move from the local area LAC1 to the local area LAC3 by way of the local area LAC4 not belonging to the home zone.

In such the both, a reference of an accounting is changed naturally according to whether or not the mobile subscriber (MS) is a subscriber of home zone services. Information capable of distinguishing therebetween is recorded in preparing the hand-over information (step S40-3).

Accordingly, such the hand-over information can be annexed to the accounting information. Namely, information such as a moving route (LAC1→LAC2→LAC3) in FIG. 12, the number of times of hand-over inside the home zone, the number of times of hand-over outside the home zone, a speaking time inside the home zone, a speaking time outside the home zone, or the like is appropriately annexed to the accounting information.

Figure 13:
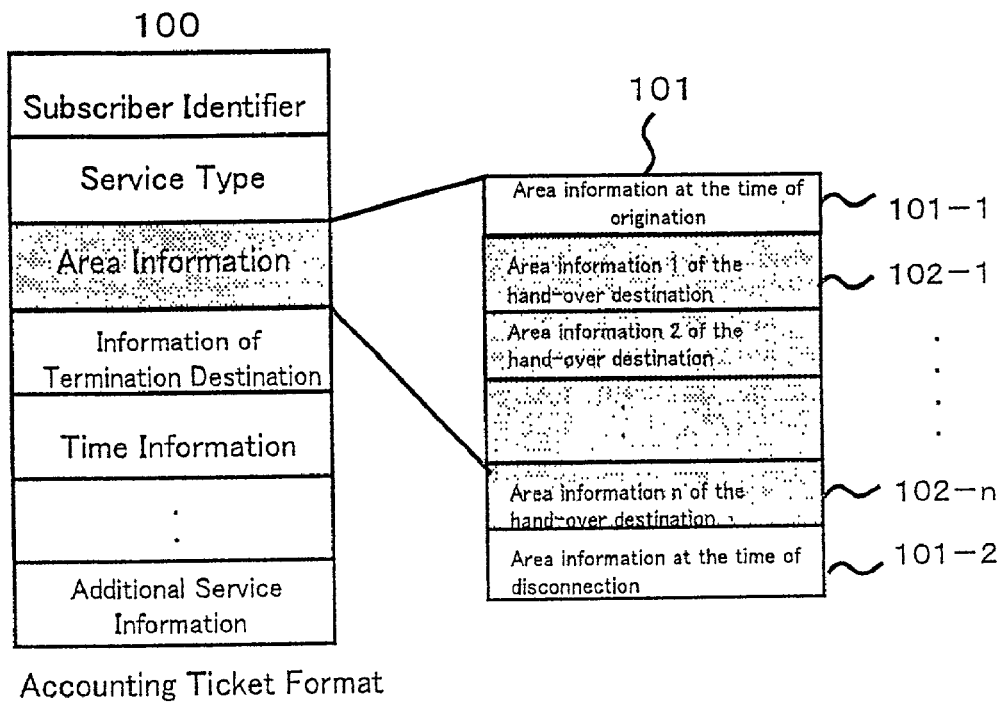
FIG. 13 is a view for explaining an example of preparing an area information field 101 for recording position information in an accounting ticket format 100 in each occurrence of hand-over.
Figure 14:
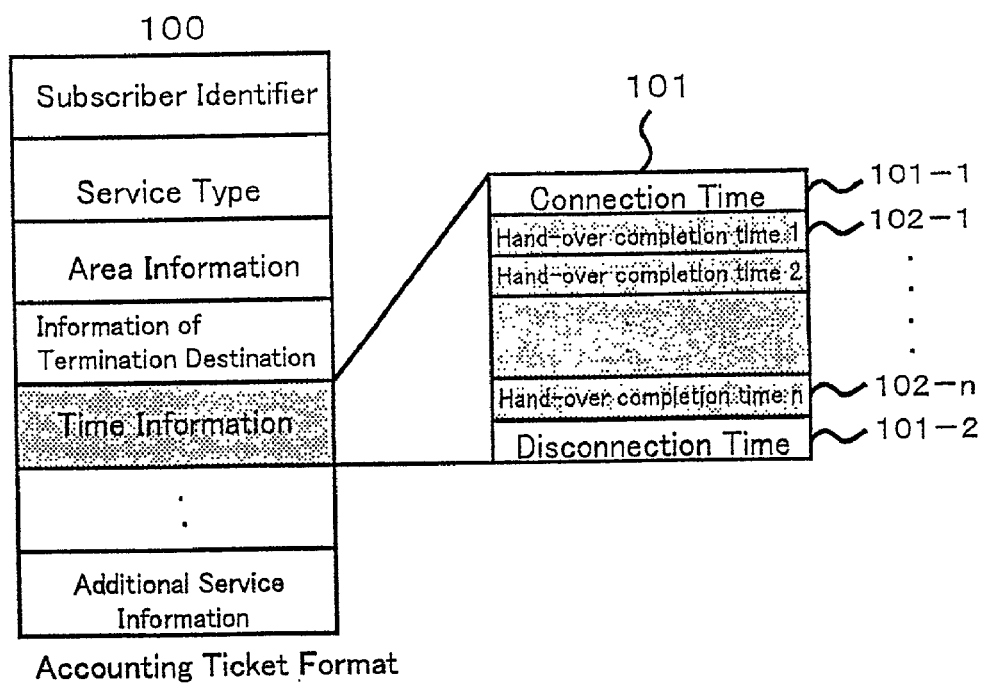
FIG. 14 is a view for explaining an example of preparing the area information field 101 for recording time information in the accounting ticket format 100 in each occurrence of hand-over.
Figure 15:
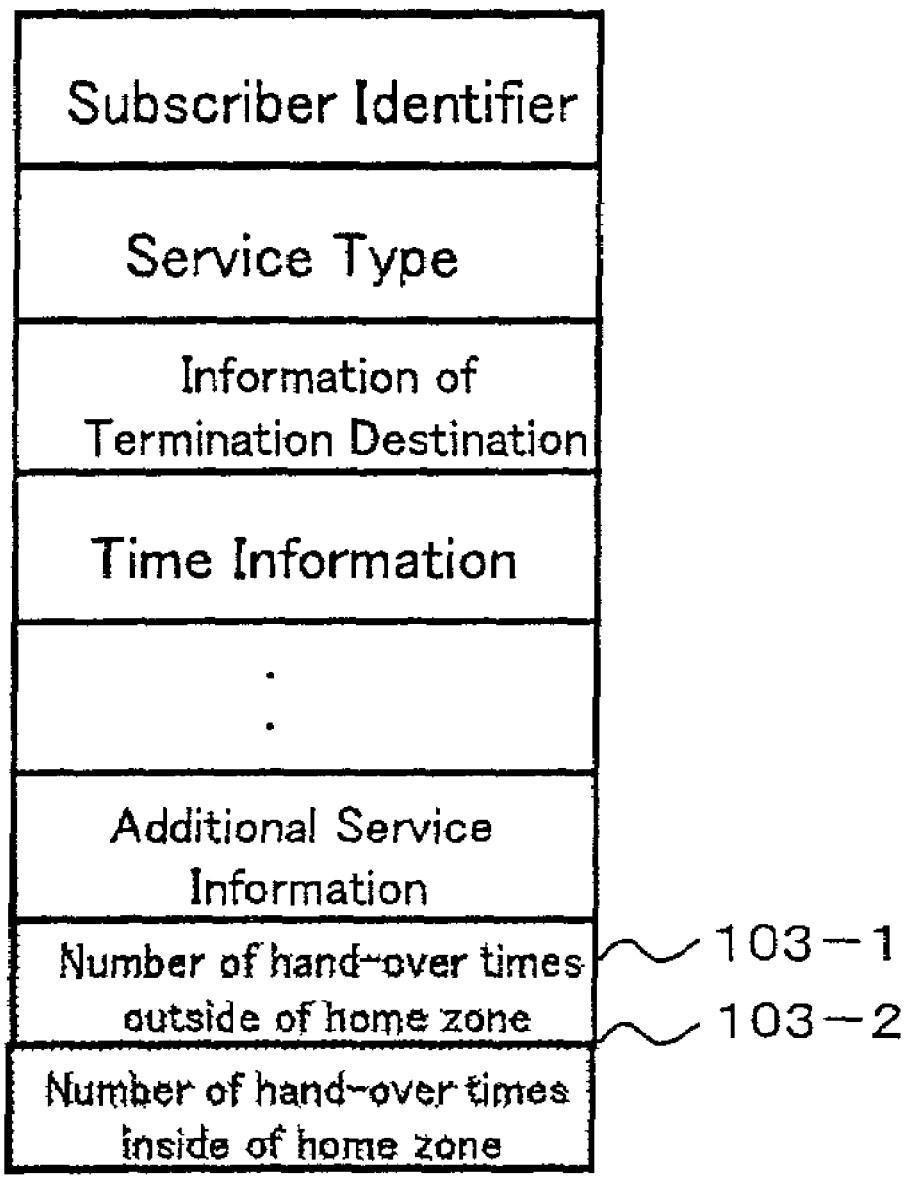
FIG. 15 is a view for explaining an example of adding the number of times of hand-over to the accounting ticket format 100 in each occurrence of hand-over.

Specifically, embodiments of FIGS. 13 to 15 are listed.

In the example of FIG. 13, an area information field 101 for recording position information in each hand-over generation is prepared in an accounting ticket format 100. In this area information 101, area information 102-1 to 102-n of a hand-over destination are recorded in each hand-over between the area information at the time of transmission 101-1 and the area information at the time of disconnection 101-2.

Each of the area information 102-1 to 102-n of the hand-over destination has flag information whether or not a hand-over destination cell and the corresponding cell are within the home zone.

In an example of FIG. 14, the position information of the mobile subscriber is compared with the registered home zone information in each generation of the hand-over. A construction of accumulating a speaking time until the hand-over generation is provided to a speaking time field for the home zone inside/outside.

That is, a time information area 101 is prepared in an accounting ticket format 100. In this time information area 101, completion times 102-1 to 102-n of each hand-over completion are recorded between a connection time at the time of transmission 101-1 and a time at the time of disconnection 101-2.

Each of the hand-over completion time information 102-1 to 102-n has flag information whether or not the hand-over completion time and cell are in the home zone. Thus, an accounting calculation is enabled referencing whether or not the speaking is within the speaking time and home zone.

In the example of FIG. 15, the position information of the subscriber is compared with the registered home zone information in each generation of the hand-over. A construction of accumulating each counting value of the hand-over counters 103-1, 103-2 for the home zone inside/outside is provided in this example.

Referring to the counter values of the respective counters, they are reflected on the accounting calculation.

Incidentally, in addition to the case where the examples of FIGS. 13, 14, 15 are solely adopted, each combination can be used. Alternatively, it is possible to adopt a method for issuing a plurality of sheets of accounting tickets in each generation of the hand-over as partial accounting information.

Figure 16:
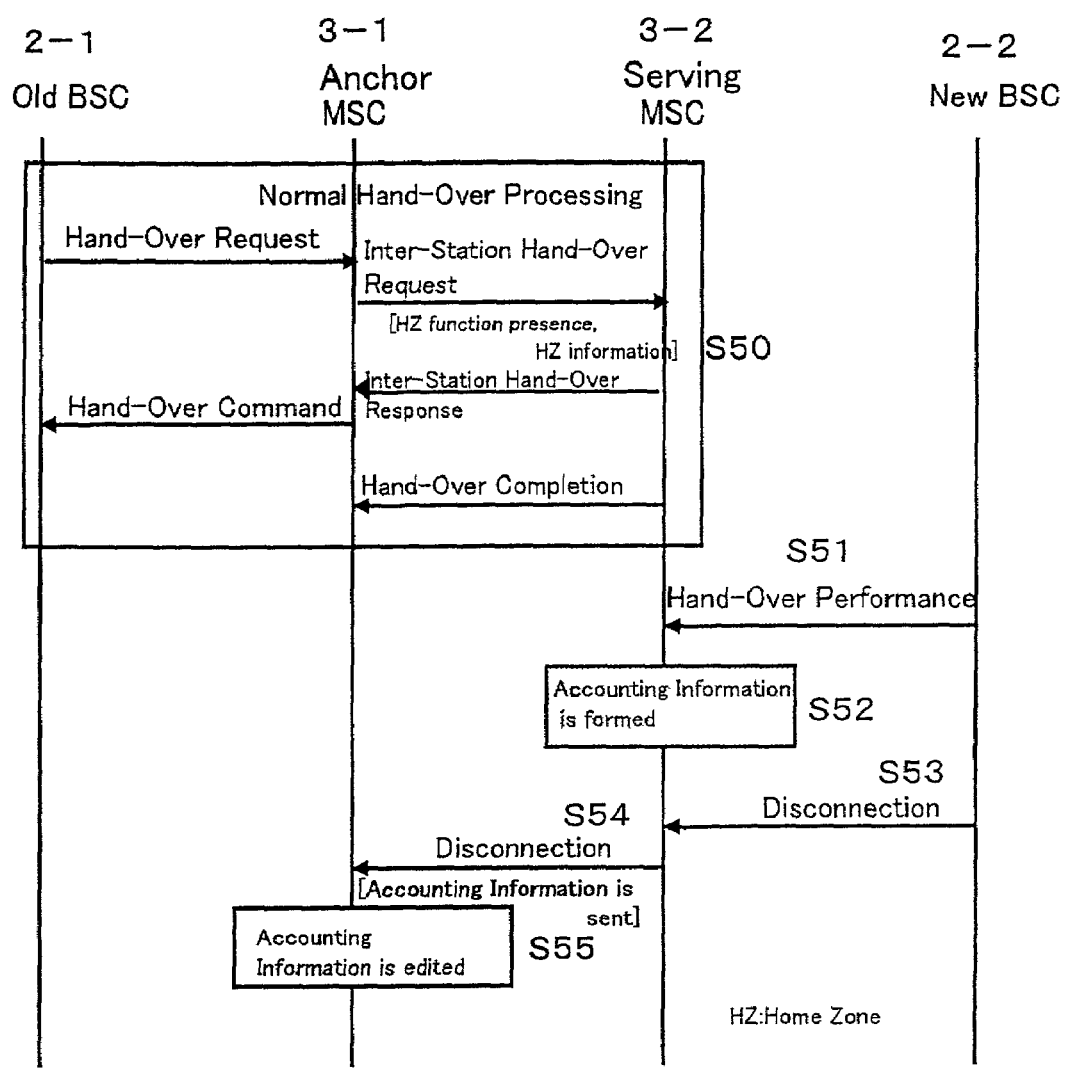
FIG. 16 is a diagram showing an example of a system taking such an aspect that the hand-over ranges over a plurality of the mobile switching centers (MSC), and an anchor moving exchange (MSC) 3-1 which collects accounting information is separated from the mobile switching center (MSC) 3-2 which executes control of the hand-over.

FIG. 16 is a diagram showing an example of a system taking such an aspect that the hand-over ranges over a plurality of the mobile switching centers (MSC), and an anchor moving switch center (MSC) 3-1 which collects the accounting information is separated from the mobile switching center (MSC) 3-2 which executes control of the hand-over.

In FIG. 16, the anchor moving switch center (MSC) 3-1 controls a normal hand-over processing shown above in the embodiment (step S50).

On the contrary, the mobile switching center (MSC) 3-2 for newly controlling a hand-over controls the hand-over for the new base station controller (BS) 2—2 (step S51). The accounting information for such the hand-over control is formed by a method, etc. shown in FIGS. 13 through 15 (step S52).

A speaking with the base station controller (BS) 2—2 is disconnected (step S53), and the formed accounting information is sent to the anchor moving switch center (MSC) 3-1 (step S54).

Accordingly, the anchor moving switch center (MSC) 3-1 can edit the accounting information taking into consideration the accounting conditions with respect to the inter-station hand-over based on the transferred accounting information (step S55).

Figure 17:
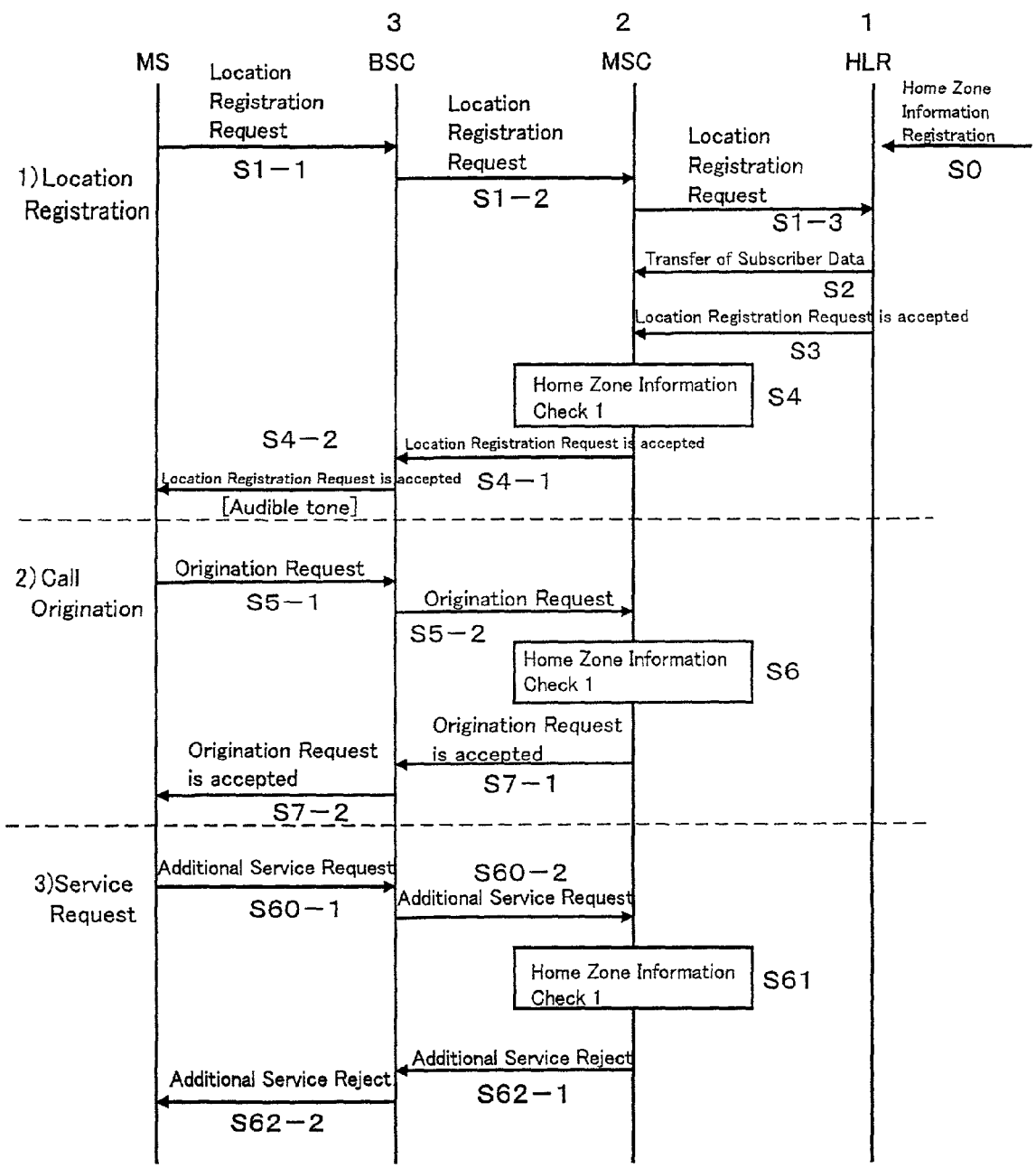
FIG. 17 is a processing flow according to a fourth embodiment of the present invention, and in contrast to the embodiment of FIG. 2, this processing flow is one in the case where, after conversation by a telephone further starts, a request of additional services is issued from the mobile subscriber (MS).

FIG. 17 is a processing flow according to a fourth embodiment of the present invention. In contrast to the embodiment of FIG. 2, this processing flow is one in the case where, after a speaking by a telephone further starts, a request of additional services is issued from the mobile subscriber (MS). The processing at the time of position registration and transmission is same as the embodiment of FIG. 2.

Accordingly, the processings from step S1-1 to step S7-2 of FIG. 17 are as described in FIG. 2.

Now, if the additional services request is issued from the mobile subscriber (MS) (step S60-1), the base station controller (BSC) 3 sends it to the mobile switching center 2 (step S60-1). The mobile switching center 2 checks the home zone information (step S61).

As for the check of the home zone information therein, with respect to the request of additional services from the mobile subscriber (MS), the mobile switching center 2 collates the position information of the mobile subscriber (MS) at the point of time when the request is issued with the type of additional services registered beforehand, and judges whether or not the request is possible to be provided.

Unless the request services are possible to be provided, it is notified to the mobile subscriber (MS) (steps S62-1, S62-2). For example, if the number of times of hand-over is defined, the number of times of hand-over is counted, and if the prescribed number of times or more, the hand-over is rejected.

In this manner, in addition to judgment at the point of time when the call is issued, even after the speaking starts, each time the subscriber's position information changes by the hand-over, etc., it is checked whether or not the subscriber's position is inside/outside the home zone. If outside the home zone, and also if the type of services (for example, a transmission) to be received outside the home zone is defined, the call is processed as services requested according to the conditions.

Figure 18:
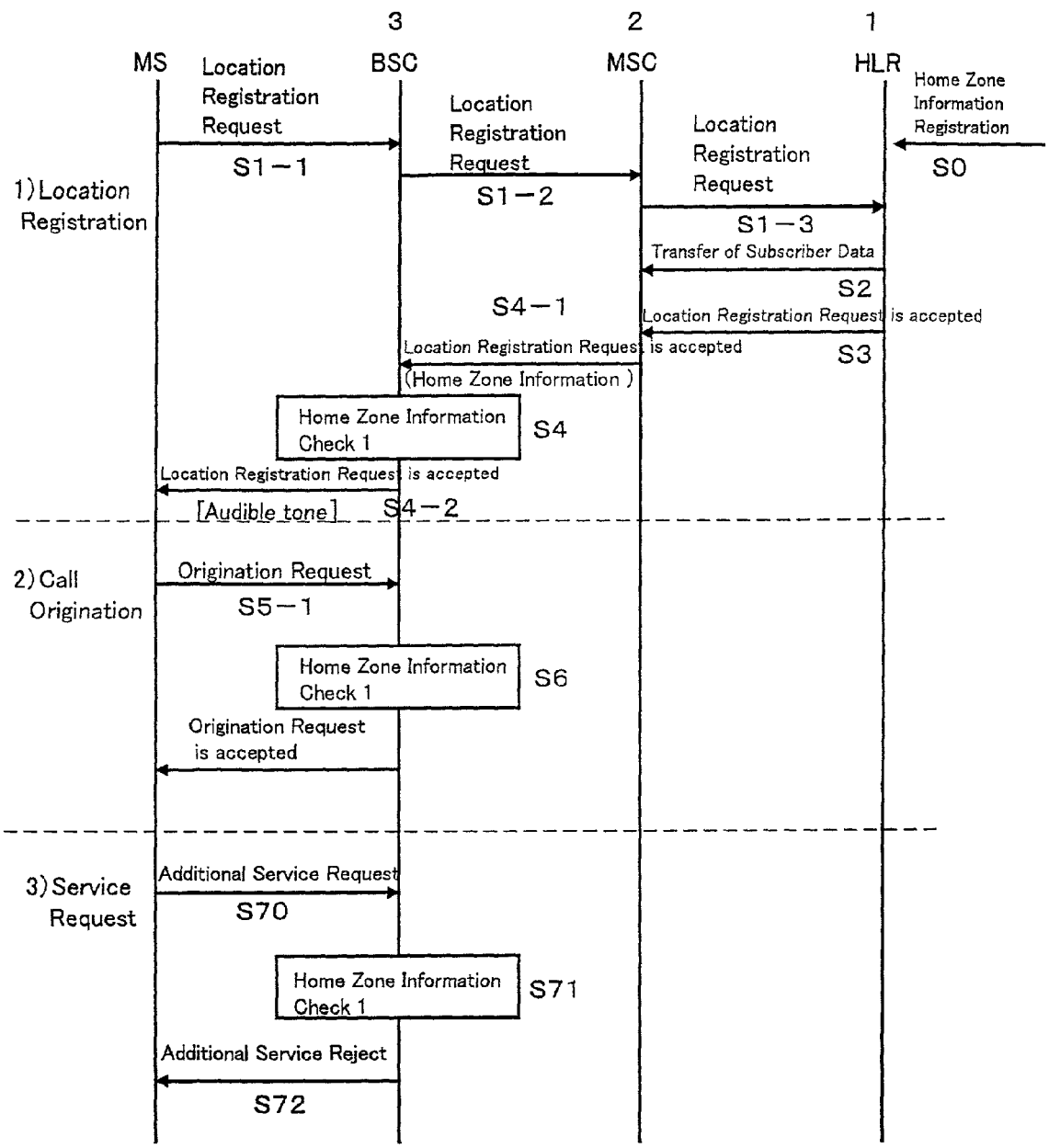
FIG. 18 is an example in which an idea of the embodiment of FIG. 16 corresponds to the embodiment of FIG. 6.

The embodiment of FIG. 18 is an example in which an idea of the embodiment of FIG. 17 corresponds to the embodiment of FIG. 6. That is, in the example in which the check of the home zone information is executed by the base station controller (BSC) 3, this is a processing flow in the case where, after the speaking starts further, a request of additional services is issued from the mobile subscriber (MS). The processings at the time of position registration and transmission are same as the embodiment of FIG. 2.

After the speaking starts, in the case where a request (step S70) of additional services from the subscriber is issued, the position information of the subscriber at the point of time when the request is generated is collated with the type of additional services registered in advance, and it is judged whether or not the request can be provided(step S71).

Unless the additional services of the request are possible to be provided, it is notified to the subscriber (step S72). If not provided, the processing is continued.

Figure 19:
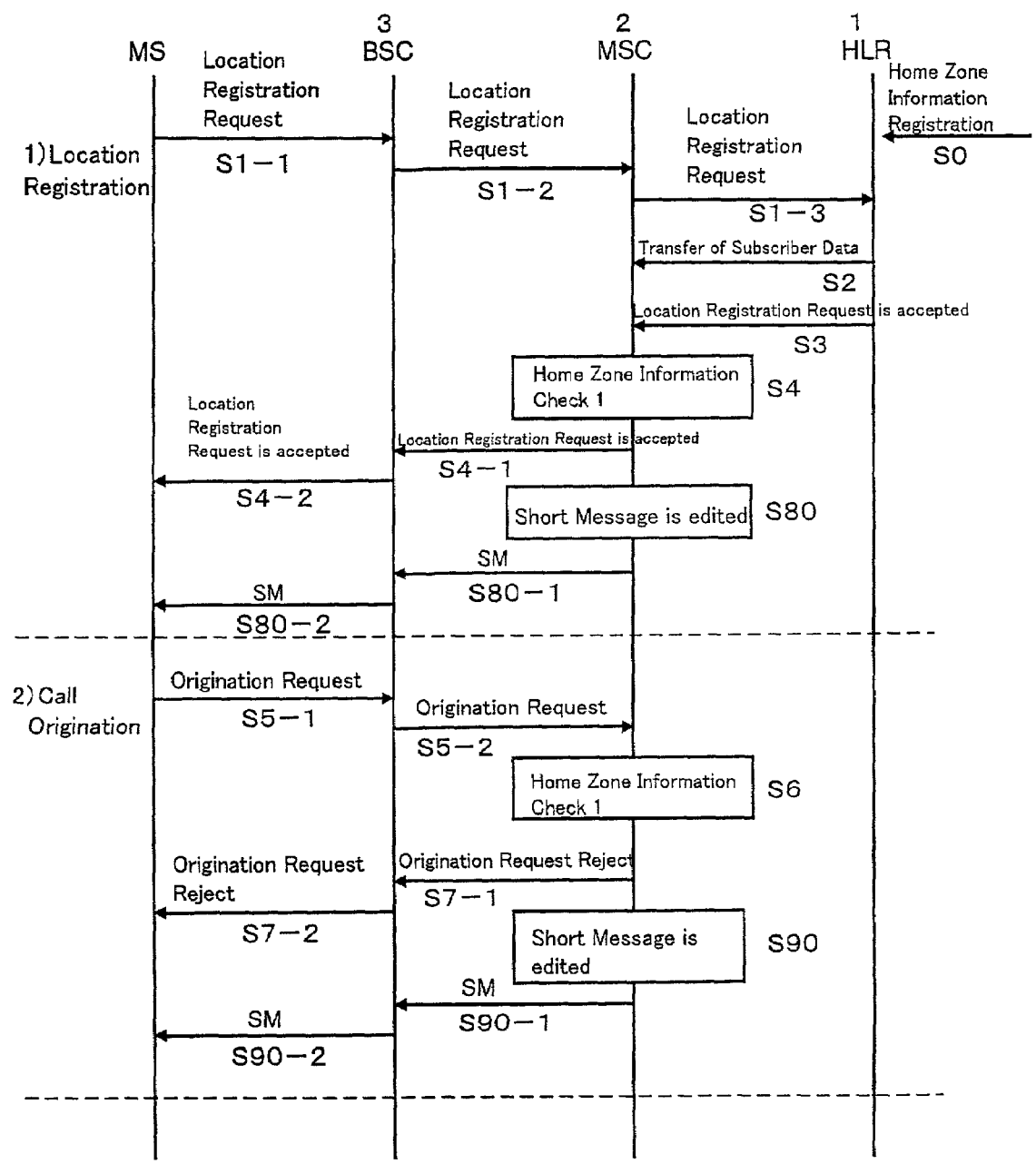
FIG. 19 is a flow according to a fifth embodiment of the present invention.

FIG. 19 is further a flow according to a fifth embodiment of the present invention. In the embodiment of FIG. 2, it is judged whether or not the subscriber is inside/outside the home zone from the position information received from the base station controller (BSC) 3 at the time when the position registration occurs (step S4), and visual information or audible information is notified to the mobile subscriber (MS) (steps S4-1, S4-2). Additionally, in this embodiment, a short message (SM) is edited (step S80) to be notified (steps S80-1, S80-2).

Figure 20:
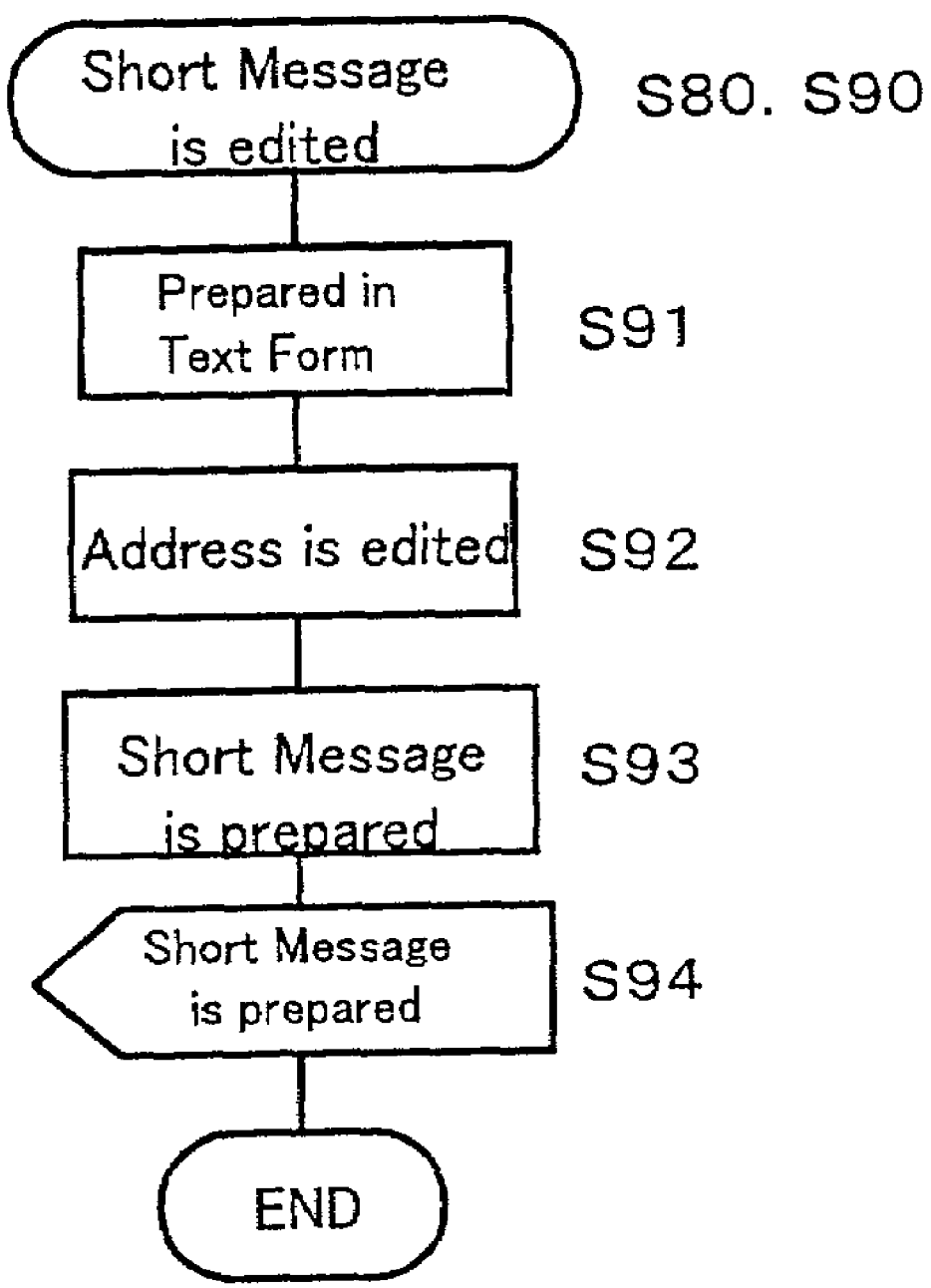
FIG. 20 is a view showing a processing flow from an edition to a transmission of a short message (SM).

The processing flow from an edition to a transmission of this short message (SM) is shown in FIG. 20. In FIG. 20, the short message is prepared in text form (step S91), and a mobile subscriber address of an addressee is edited (step S92). The address is added to the text message to prepare the short message (step S93). Next, the prepared short message is sent (step S94).

Returning to FIG. 19, even in the case where the transmission and reception occur, in the same manner as the embodiment of FIG. 2, after the home zone information is checked (step S6), a rejection of the transmission request is audibly notified (steps S7-1, S7-2). Furthermore, in this embodiment, the short message (SM) is edited (step S90) to be notified (steps S90-1, S90-2). The content of the edition (step S90) of this short message (SM) is as explained in FIG. 20.

Figure 21:
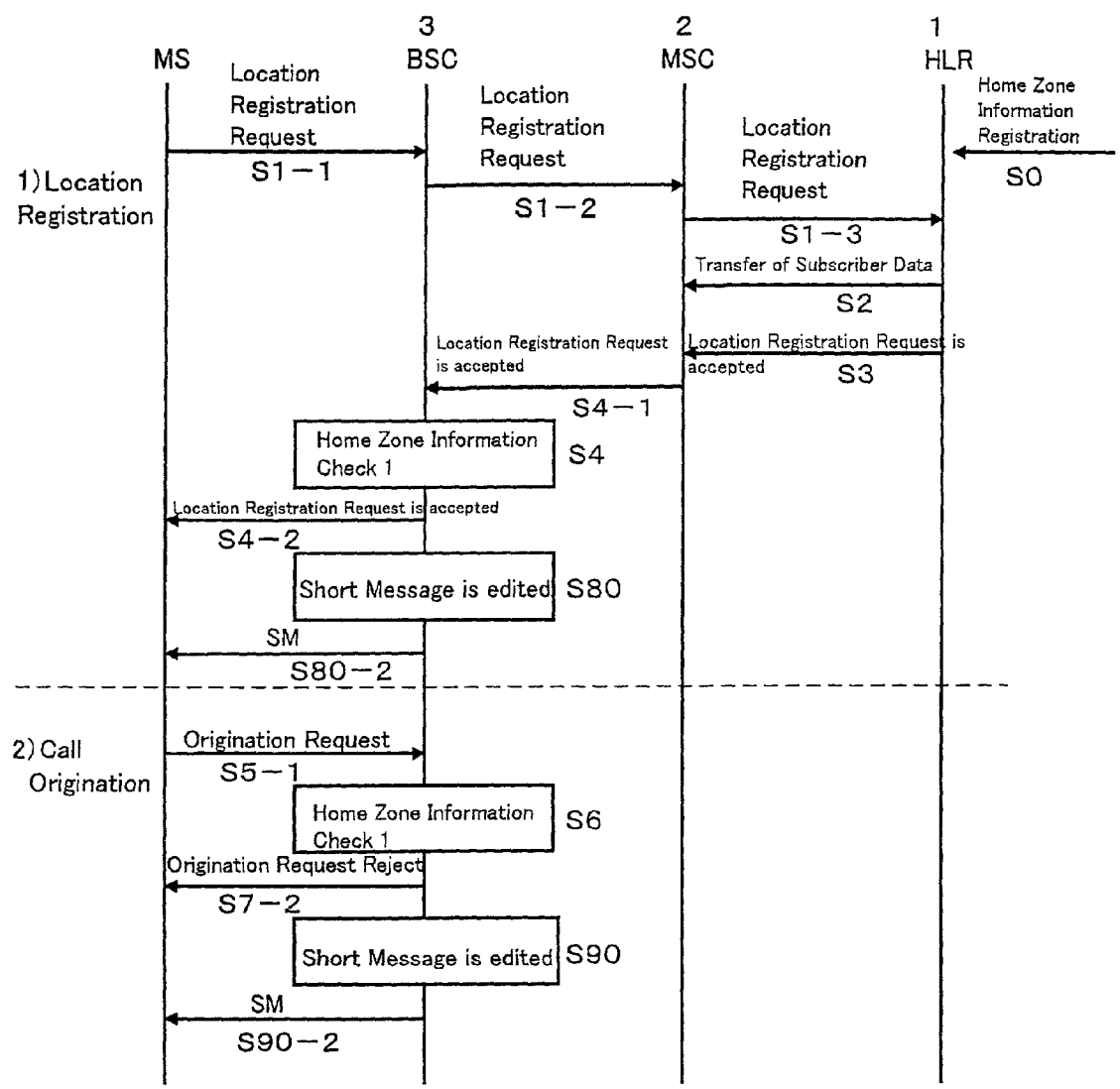
FIG. 21 is a flow showing an embodiment in which, in the base station controller (BSC) 3 itself shown in FIG. 17, functions of a short message edition shown in FIG. 19 are applied to the embodiment which checks home zone information.

FIG. 21 is a flow showing an embodiment in which, in the base station controller (BSC) 3 itself shown in FIG. 18, functions of a short message edition shown in FIG. 20 are applied to the embodiment which checks home zone information.

The content of the short message edition is as explained in FIGS. 19 and 20.

Figure 22:
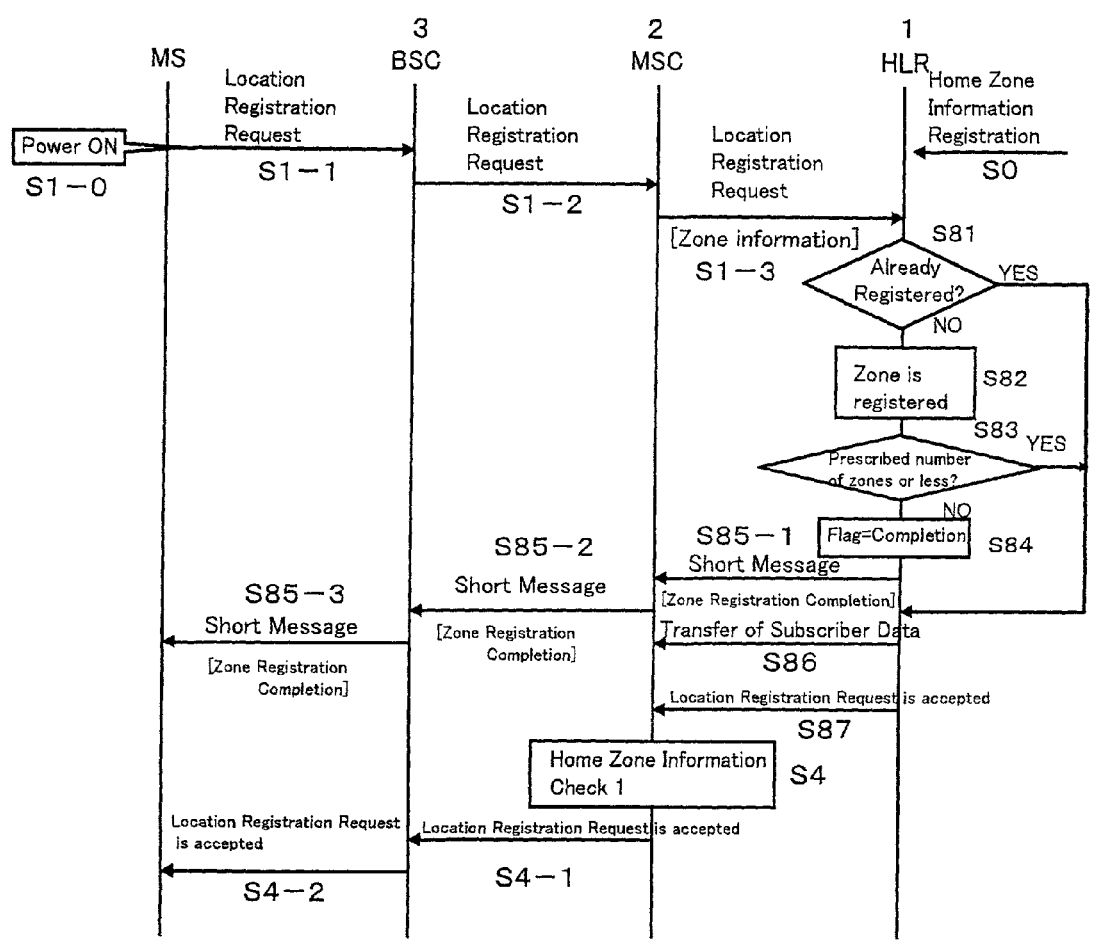
FIG. 22 is a flow showing a method for registering a home zone.

FIG. 22 is a flow showing a method for registering a home zone. The embodiment of FIG. 6 is an example in which, when subscriber's data are registered (step S0), the home zone is registered.

On the contrary, in the embodiment of FIG. 22, the mobile subscriber (MS) moves to a geographical area where the subscriber considers registering as his/her own home zone, and powers up a terminal (step S1-0). The mobile switching center (MSC) 2 which receives the location registration from the terminal executes a normal location registration process (steps S1-1, S1-2).

Next, the mobile switching center (MSC) 2 notifies the home location register (HLR) 1 of the below location information in which the mobile subscriber (MS) executes a location registration (step S1-3). Here, as the location information;

① In the case where unit of the home zone is a cell or a location registration area, the information is as it stands;

② If a newly defined zone, a cell or location registration area information are converted in the mobile switching center (MSC).

③ In the case of ② as mentioned above, the cell or location registration area information is transmitted to the home location register (HLR) 1 as it stands, and it is possible to also provide a conversion function to the home location register (HLR) 1.

In the case where the request subscriber subscribes to home zone services, the home location register (HLR) 1 which received the location registration request confirms an already registered flag of a registration area (step S81). If not registered, a zone is registered (step S82), and it is confirmed that the number of zones reaches a prescribed number (step S83).

If the prescribed number of zones or less, the already registered flag # is still alive, and the normal location registration process is executed (step S83: YES).

If reaching the prescribed number of zones, the already registered flag is set as completion, and the normal location registration process is executed (step S84).

Since the mobile subscriber (MS) is notified that the zone is registered as a home zone, the following procedure is prepared:

① When the position registration end is notified from the home location register (HLR) 1 to the mobile switching center (MSC) 2, information in a home zone registration is notified together, and the mobile switching center (MSC) 2 transmits back the content as it stands to the mobile subscriber (MS) (steps S85-1, S85-2, S85-3).

It is possible to make the notification at this time as the short message (SM) explained previously as the embodiment.

② The position registration end is notified as normally from the home location register (HLR) 1 to the mobile switching center (MSC) 2 (step S87). At this time also, it is possible to perform as the short message (SM).

Figure 23:
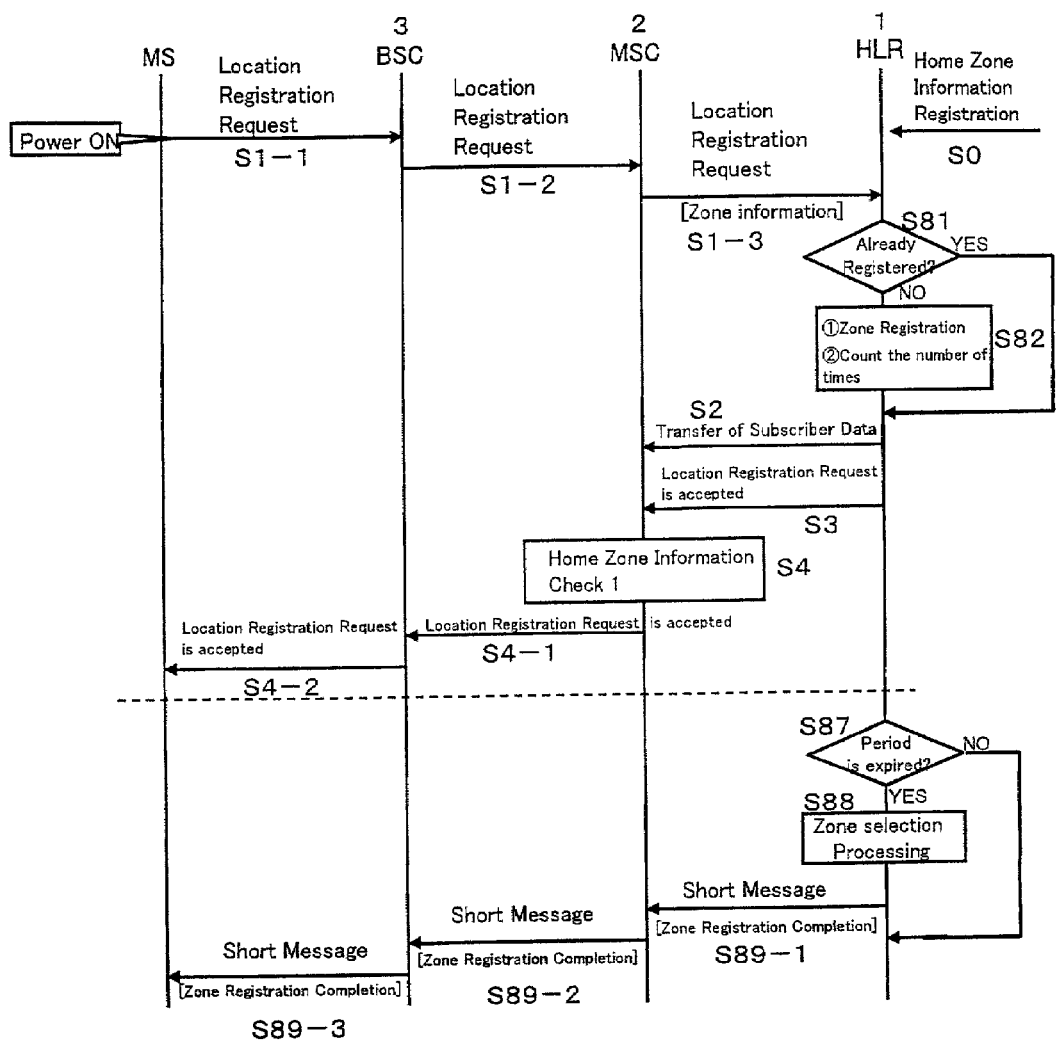
FIG. 23 is a flow showing another method for registering the home zone.

FIG. 23 is a flow showing still another method for registering a home zone.

First, in the home location register (HLR) 1, it is judged whether or not the home zone has already been registered, each time the location registration is requested (step S81).

If the home zone has not yet been registered, the number of times of location registration request is accumulatively counted. When the number of times of location registration request reaches a predetermined value, the home zone is registered (step S82).

Furthermore, as another method, a registration period of the home zones is set. Each time the location registration is requested, the corresponding home zones are provisionally registered, respectively. When a predetermined period is expired (step S87), the area where the number of times of provisional registrations is at a maximum is registered as the home zone from the provisionally registered home zones (step S88).

In this manner, when the zone registration is completed, the short message is notified to the mobile switching center (MS) through the mobile switching center (MSC) 2 and base station controller (BSC) 3 (steps S89-1, S89-2, S89-3).

Incidentally, concerning the short message, ① in the case where the registration targeting zone is the registrable number or more, the zone is selected and registered from the highest number of times, and the fact is notified to the subscriber. It is assumed that the fact is registered as an autonomous message, and an operator notifies it, or the short message is edited and notified by the home location register (HLR).

② In the case where the registration targeting zone is the registrable number or less, all are registered, and the already registered flag is set as completion. Thereafter, it is notified to the subscriber. Similarly, it is assumed that the fact is registered as the autonomous message, and an operator notifies it, or the short message is edited and notified by the home location register (HLR).

As described above, the embodiments were explained with reference to the drawings. According to the present invention, the operator can provide mobility which is restricted to the mobile subscribers, and can provide a tariff system rich in variety.

Not only the position information at the point of time when the call is generated, but also a restriction of mobility during speaking by a telephone could be executed, and this could be reflected on the accounting information.

What is claimed is:

1. A radio switching system comprising:
   a mobile subscriber;
   a base station controller for controlling a transmission and reception of a signal from the mobile subscriber within its own cell;
   a mobile switching center connecting with a plurality of base station controllers; and
   a home location register for storing home zone information indicating whether or not the mobile subscriber is a subscriber of a home zone service, which restricts a moving area of the mobile subscriber, wherein
   the mobile switching center judges responsively to a position registration request inside/outside a home zone, which is a cell and location registration area or another newly defined zone unit, by the mobile subscriber, whether or not the registration is accepted in the home zone, based on the home zone information transmitted from the home location register, and
   wherein each time a radio area is changed by a hand-over of the mobile subscriber, the mobile switching center further receives a hand-over request, first selects a hand-over destination by judging whether or not a base station controller as a hand-over destination candidate is under control of the home zone, and in the case where the hand-over destination candidate is under control of the home zone, renews and stores the number of times of hand-over and hand-over area information to transmit to an accounting center as accounting information, so as to utilize an accounting calculation.

2. The radio switching system according to claim 1, further comprising a plurality of the mobile switching centers, wherein when the change of the radio area byte hand-over of the mobile subscriber strides over the plurality of mobile switching centers, the home zone information is added to existent hand-over messages, and is transmitted and received between the plurality of mobile switching centers.

3. The radio switching system according to claim 1, wherein the mobile switching center collects a history in the hand-over daring speaking by a telephone as accounting information.

4. The radio switching system according to claim 3, wherein the history in the hand-over is the number of times of hand-over, positions of an ex-address and new address, or cell information.

5. The radio switching system according to claim 1, comprising means for notifying the mobile subscriber of the point of time when an access by the mobile subscriber is caused and a fact that the subscriber is inside or outside the home zone during speaking by the telephone.

6. The radio switching system according to claim 5, wherein the means for notifying the mobile subscriber sends audible information or text information.

7. The radio switching system, comprising:
   a mobile subscriber;
   a base station controller for controlling a transmission and reception of a signal of the mobile subscriber within its own cell;
   a mobile switching center connecting with a plurality of the base station controllers; and
   a home location register for storing home zone information whether or not the mobile subscriber is a subscriber of home zone services, wherein
   the mobile switching center sets a location registration area as a home zone, a first location registration being performed on the location registration area, after the mobile subscriber subscribed in the home zone services makes a service subscription request or the mobile switching center sets location registration area areas as a home zone, until the number of location registration areas on which location registrations have been performed reaches a predetermined number, in the case where the mobile subscriber desires to register a plurality of areas.

8. A radio switching system, comprising:
   a mobile subscriber;
   a base station controller for controlling a transmission and reception of a signal of the mobile subscriber within its own cell;
   a mobile switching center connecting with a plurality of the base station controllers; and
   a home location register for storing home zone information whether or not the mobile subscriber is a subscriber of home zone services, wherein
   the mobile switching center has means for counting the number of times that the mobile subscriber subscribed in the home zone services performs location registration in each area within a predetermined period of time, and the mobile switching center sets as a home zone the location registration area where the number of times of registration counted by the counting means is high after the predetermined period of time is expired.

9. A method of collecting accounting information in a mobile switching center in a radio switching systems,
   the method comprising:
   in the mobile switching center, receiving a hand-over request, first selecting a hand-over destination by judging whether or not a base station controller as a hand-over destination candidate is under control of the home zone; and in the case where the hand-over destination candidate is under control of the home zone, renewing and storing the number of times of hand-over and hand-over area information to generate accounting information; and
   in an accounting center, receiving from the mobile switching center accounting information based on controlling a hand-over; and
   editing the accounting information based on account conditions in accordance with the hand-over,
   wherein the accounting information contains a subscriber identifier, and recognition information including one of the interior and exterior of a home zone, which is a cell and location registration area or another newly defined zone unit, assigned to the subscriber identifier.

* * * * *